(12) United States Patent  (10) Patent No.: US 7,774,642 B1
Johnsen et al. (45) Date of Patent: Aug. 10, 2010

(54) FAULT ZONES FOR INTERCONNECT FABRICS

(75) Inventors: Bjørn Dag Johnsen, Oslo (NO); David M. Brean, Boston, MA (US); Srinivas Madhur, Westford, MA (US); Julia D. Harper, Arlington, MA (US)

(73) Assignee: Oracle America, Inc., Redwood Shores, CA (US)

( * ) Notice: Subject to any disclaimer, the term of this patent is extended or adjusted under 35 U.S.C. 154(b) by 882 days.

(21) Appl. No.: 11/061,236

(22) Filed: Feb. 17, 2005

(51) Int. Cl.
*G06F 11/00* (2006.01)

(52) U.S. Cl. ............... 714/6; 714/4; 714/5; 714/40; 714/41; 714/44; 714/47

(58) Field of Classification Search ............ 714/40–44, 714/4, 6, 47, 5, 10
See application file for complete search history.

(56) References Cited

U.S. PATENT DOCUMENTS

| | | | | |
|---|---|---|---|---|
| 5,301,311 | A * | 4/1994 | Fushimi et al. | 714/23 |
| 5,413,611 | A * | 5/1995 | Haslam et al. | 623/25 |
| 6,041,041 | A * | 3/2000 | Ramanathan et al. | 370/241 |
| 6,085,329 | A * | 7/2000 | Klein | 713/322 |
| 6,314,526 | B1 * | 11/2001 | Arendt et al. | 714/4 |
| 6,427,163 | B1 * | 7/2002 | Arendt et al. | 709/201 |
| 6,547,365 | B1 * | 4/2003 | Alberto et al. | 347/19 |
| 6,718,383 | B1 * | 4/2004 | Hebert | 709/224 |
| 6,801,937 | B1 * | 10/2004 | Novaes et al. | 709/220 |
| 6,961,768 | B2 * | 11/2005 | Davis et al. | 709/224 |
| 6,973,517 | B1 * | 12/2005 | Golden et al. | 710/104 |
| 7,058,544 | B2 * | 6/2006 | Uzarski et al. | 702/184 |
| 7,219,254 | B2 * | 5/2007 | Rathunde et al. | 714/1 |
| 7,263,459 | B2 * | 8/2007 | Ito et al. | 702/138 |
| 7,484,032 | B2 * | 1/2009 | Smith | 710/316 |
| 7,512,830 | B2 * | 3/2009 | Chu et al. | 714/4 |
| 7,627,774 | B2 * | 12/2009 | Egan et al. | 714/4 |
| 2002/0069274 | A1 * | 6/2002 | Tindal et al. | 709/223 |
| 2003/0028680 | A1 * | 2/2003 | Jin | 709/313 |
| 2004/0205689 | A1 * | 10/2004 | Ellens et al. | 717/100 |
| 2004/0261079 | A1 * | 12/2004 | Sen | 719/310 |
| 2004/0261116 | A1 * | 12/2004 | Mckeown et al. | 725/109 |
| 2005/0027851 | A1 * | 2/2005 | McKeown et al. | 709/224 |
| 2006/0106590 | A1 * | 5/2006 | Tseng et al. | 703/20 |
| 2006/0153068 | A1 * | 7/2006 | Dally et al. | 370/219 |
| 2006/0168339 | A1 * | 7/2006 | Shapiro et al. | 709/241 |

* cited by examiner

*Primary Examiner*—Scott T. Baderman
*Assistant Examiner*—Loan Truong
(74) *Attorney, Agent, or Firm*—Park, Vaughan & Fleming LLP

(57) ABSTRACT

A fault zone definition mechanism groups components of an interconnect environment having a common point of dependence into a logical group defining a fault zone for the interconnect environment. The fault zone definition mechanism may be implemented in software, firmware or hardware, or a combination of two or more of software, firmware and hardware. A method for defining a fault zone is also disclosed.

22 Claims, 31 Drawing Sheets

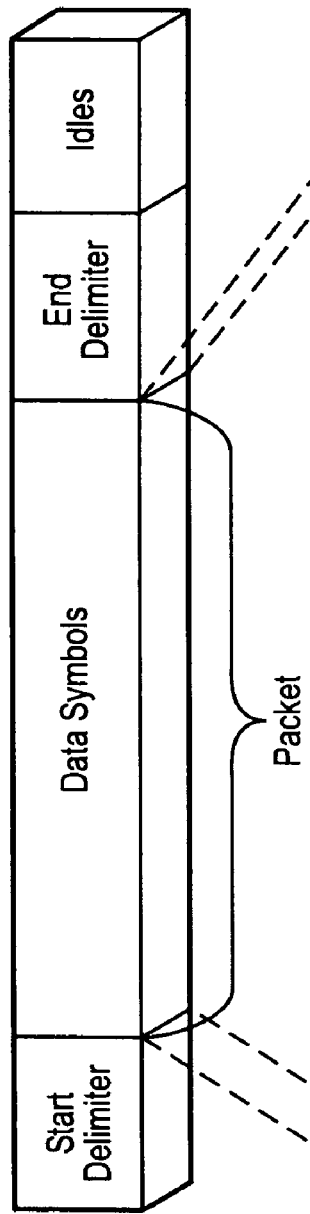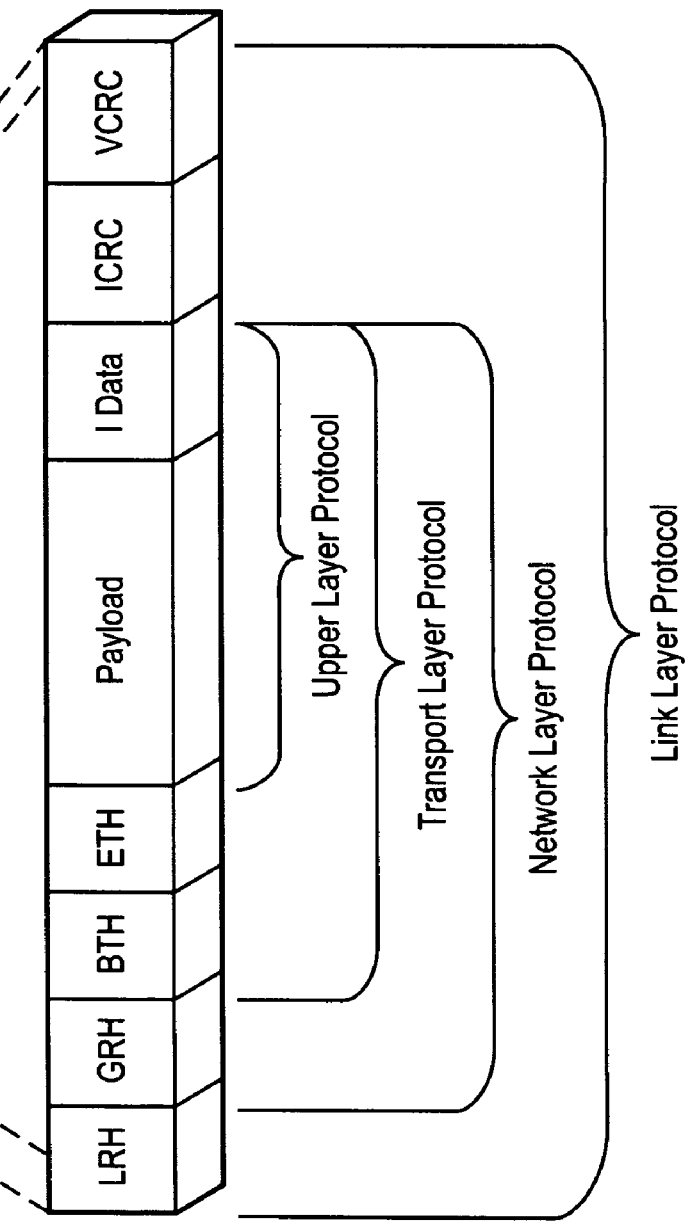

FAULT ZONES FOR INTERCONNECT FABRICS

FIELD

The present invention relates to a fault zone definition module for an interconnect environment. In particular, but not exclusively, the present invention relates to system area networks such as may be implemented using an InfiniBand™ Architecture.

INTRODUCTION

In order to increase the processing power of computer systems, the routing of data and to improve computer system reliability, System Area Networks for connecting multiple independent processor platforms, I/O platforms and I/O devices have been developed. The various processing platforms and devices are connected together by switches which route data and messages between the computing platforms and various input/output devices. Such multi-processing architectures are used in critical applications requiring high availability and reliability. One approach to providing a high level of reliability, and hence availability, is to include a significant level of redundancy in the system area network. In light of any failure of a component within the system area network, another component will be used in its place. However, such redundancy increases the component count of such systems, and hence their complexity, size and cost. Additionally, mere redundancy does not address all the issues associated with improved reliability and availability.

SUMMARY

The present invention has been made, at least in part, in consideration of problems and drawbacks of commercial systems and to improve their reliability.

In particular, the applicant has appreciated that providing independent paths through an interconnect environment, for example a system area network, will further enhance reliability and therefore availability. An independent path is a path through the system area network which does not share a component or share or have common dependency on a single component with another path. The sharing of a component, or dependency on a component between paths represents a single point of failure for both paths, and therefore the paths will not be independent of each other.

In particular, embodiments of the present invention can provide a mechanism and method for defining fault zones in an interconnect environment, and also to provide a system utilising defined fault zones in order to provide independent paths for communications through the interconnect environment.

In a general sense, the applicant has realised that in an environment in which there are many processing platforms and devices, for example in a multi-processing architecture, identifying which groups of components rely on, share or use each other, or share dependency on a single component, provides for the identification of those groups of components as single points of failure within the environment.

Viewed from a first aspect, the present invention provides a fault zone definition mechanism which groups components of an interconnect environment having a common point of dependence into a logical group defining a fault zone for the interconnect environment. The fault zone definition mechanism may be implemented in software, firmware or hardware, or a combination of two or more of software, firmware and hardware. A method for defining a fault zone can also be used. This enables resource interdependencies to be managed within an interconnected environment, thereby allowing reliability to be increased.

Viewed from a second aspect, the present invention provides a fault zone definition mechanism for an interconnect environment comprising a plurality of components. The mechanism is operable to analyse properties of components of an interconnect environment to determine a dependency status for each component; and to group components having a common dependency status into a logical group defining a fault zone for said interconnect environment. Thereby a managed arrangement of resources can be achieved, allowing component interdependencies to be monitored for increased reliability.

Viewed from another aspect, the present invention provides a local resource manager module operable for a chassis defining a physical support for units including one or more components of an interconnect environment. The local resource manager module is operable to define a fault zone for the interconnect environment. The defining can comprise: analysing components of the interconnect environment to determine a dependency status for each component; and grouping components having a common dependency status into a logical group defining a fault zone for said interconnect environment. Thus a local service module can provide a locally controlled management arrangement for components local to that service module.

Viewed from a further aspect, the present invention provides a chassis defining a physical support for units including components of an interconnect environment. The chassis can comprise: a computing platform including a service processor and a memory space; and a box manager module operable to execute on the computing platform and operable to define a fault zone for the interconnect environment. The defining can comprise: analysing components of the interconnect environment to determine a dependency status for each component; and grouping components having a common dependency status into a logical group defining a fault zone for said interconnect environment within said chassis. Accordingly, the chassis can adopt a managed interdependencies protocol allowing resources both internal and external to the chassis to make use of services provided by chassis components with full visibility of a service reliability level which those components can provide.

Viewed from another aspect, the present invention provides a method of defining a fault zone for an interconnect environment. The method can comprise: analysing components of the interconnect environment to determine a dependency status for each component; and grouping components having a common dependency status into a logical group defining a fault zone for said interconnect environment. Thereby various interdependent components within an interconnected computing environment can be grouped into a managed arrangement of reliable resource providers.

Not only may embodiments of the invention determine and define independent paths through an interconnect environment, but also be used to implement high availability services, e.g. an application, by allocating an independent set of server blades, storage resources and external network interfaces and a set of independent paths between the resources that need to communicate.

BRIEF DESCRIPTION OF THE FIGURES

Specific embodiments of the present invention will now be described, by way of example only, with reference to the accompanying figures in which:

FIG. 6 shows schematically the structure of a message to be transmitted via an InfiniBand™ Architecture;

FIG. 7 shows schematically the format of a packet of the message of FIG. 6;

Figure 1:
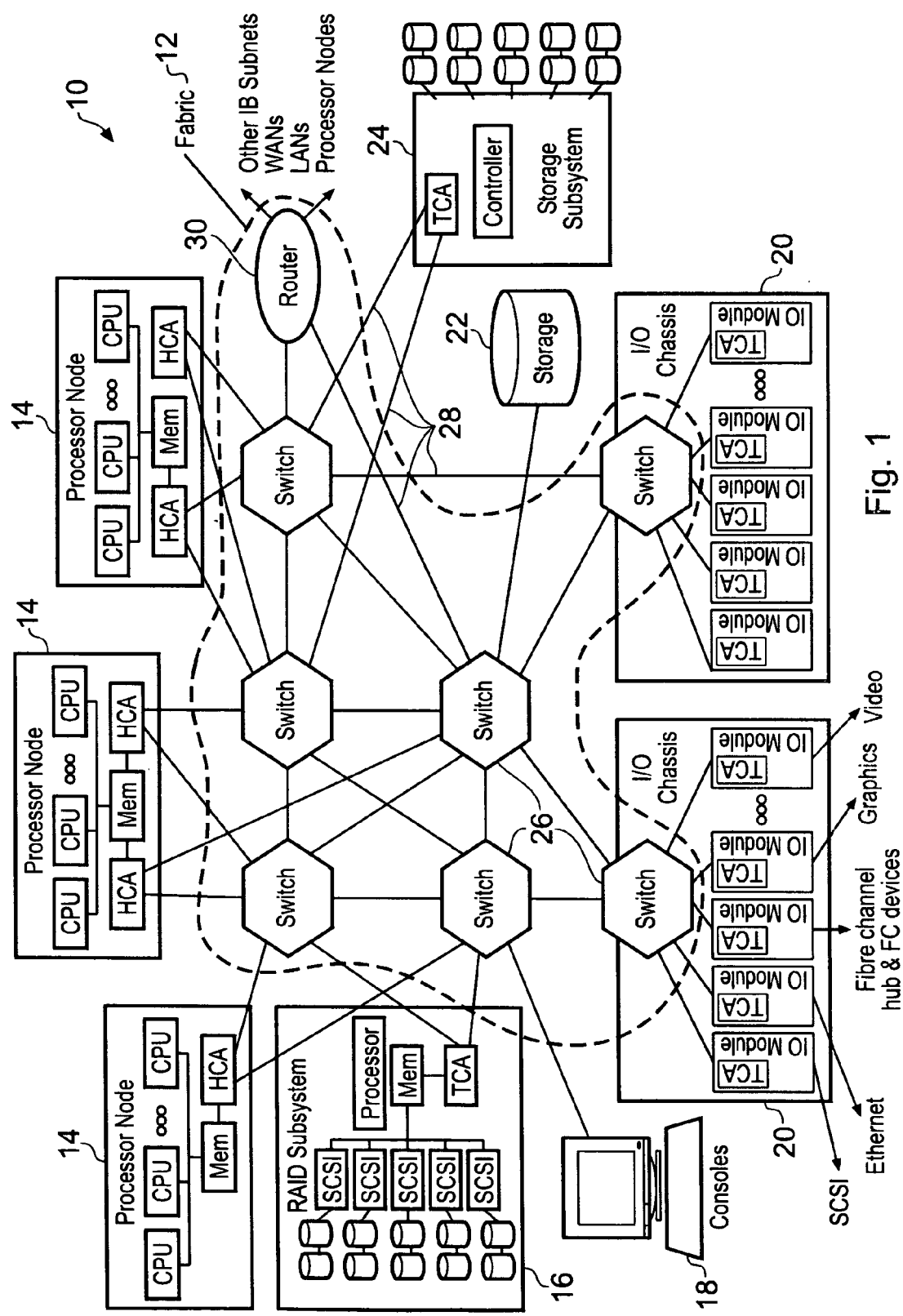
FIG. 1 is a schematic block diagram showing an example of the interconnection of computing system elements via the InfiniBand™ networking Architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF SPECIFIC EMBODIMENTS

A particular computer networking architecture is the InfiniBand™ Architecture. InfiniBand™ is a standard architecture defined and administered by the InfiniBand™ Trade Association, which was founded by Compaq, Dell, Hewlett-Packard, IBM, Intel, Microsoft and Sun Microsystems. The InfiniBand™ Architecture defines a System Area Network (SAN) for connecting multiple independent processor platforms (i.e. host processor nodes), I/O platforms and I/O devices. A full definition of the InfiniBand™ Architecture may be found in the InfiniBand™ Architecture Specification Volumes 1 and 2, available from the InfiniBand™ Trade Association. InfiniBand™ defines a standard for flexible and high speed interconnect between computing systems or parts of computing system such as processor and I/O nodes. InfiniBand™ allows an order of magnitude more flexibility and scalability than conventional bus-based systems through a highly hardware coupled and low latency interface, which is a key factor in multiprocessing architectures.

The InfiniBand™ Architecture SAN is a communications and management infrastructure supporting both I/O and inter-processor communications for one or more computer systems. An InfiniBand™ Architecture system can range from a small server with one processor and a few I/O devices to a massively parallel supercomputer installation with hundreds of processors and thousands of I/O devices.

The InfiniBand™ Architecture defines a switched communications fabric allowing many devices to concurrently communicate with high bandwidth and low latency in a protected, remotely managed environment. An end node can communicate with or over multiple InfiniBand™ Architecture ports and can utilise multiple paths through the InfiniBand™ Architecture fabric. A multiplicity of InfiniBand™ Architecture ports and paths through the network are provided for both fault tolerance and increased data transfer bandwidth.

InfiniBand™ Architecture hardware off-loads from the CPU much of the I/O communications operation. This allows multiple concurrent communications without the traditional overhead associated with communicating protocols. The InfiniBand™ Architecture SAN provides its I/O and interprocessor communications clients zero processor-copy data transfers, with no kernel involvement, and uses hardware to provide highly reliable, fault tolerant communications.

An example of an InfiniBand™ Architecture System Area Network is shown in FIG. 1. As can be seen from FIG. 1, a System Area Network 10 comprises an InfiniBand™ Architecture fabric (or Subnet) 12 made up of cascaded switches and routers. The fabric 12 provides links between a number of processor nodes 14 and other nodes including a RAID Subsystem 16, consoles 18, I/O Chassis 20, Storage 22 and a Storage Subsystem 24. The Fabric 12 is made up of a plurality of switches 26 having interconnections 28 providing data connections therebetween and between the nodes attached to the fabric 12. Also comprised in the fabric 12 is a router 30 for providing connections to and from other networks, which may be other InfiniBand™ Architecture subnets, non-InfiniBand™ Architecture LANs and WANs and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, RAID subsystems 16, consoles 18, I/O Chassis 20, Storage 22 and Storage Subsystems 24 are known as endnodes 32. Nodes comprising a channel adapter (either a TCA or HCA), a switch or router are known collectively as InfiniBand (IB) nodes.

Each endnode 32 has therein a Channel Adapter, which may be a Host Channel Adapter (HCA) or a Target Channel Adapter (TCA). Host Channel Adapters are typically to be found in processor nodes 14, and Target Channel Adapters are typically to be found in I/O Nodes 16, 18, 20, 22 and 24 as illustrated in FIG. 1. Host Channel Adapters are configured to issue requests across the fabric 12, and Target Channel Adapters are configured to respond to such requests, for example by supplying requested data or storing supplied data. Each Channel Adapter uses a queuing system based on Queue Pairs, one queue for send operations and one for receive operations. Each Queue Pair may therefore be considered to provide a virtual communication port of a Channel Adapter. Each Channel Adapter may have up to $2^{24}$ Queue Pairs, which may be assigned individually or in combination to handle operations affecting different parts (or consumers) of an endnode 32. For example, a processor node 16 may comprise a plurality of processors and each processor may have one or more individual Queue Pairs assigned to handle requests and responses flowing to and from that processor of that processor node 16 via the fabric 12. Alternatively, or in addition, a processor of a given processor node 16 may be running more than one process and each process may have one or more Queue Pairs assigned to handle requests and responses flowing to and from that process via the fabric 12.

The interconnects 28 may be one of three classes, 1×, 4× or 12×, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
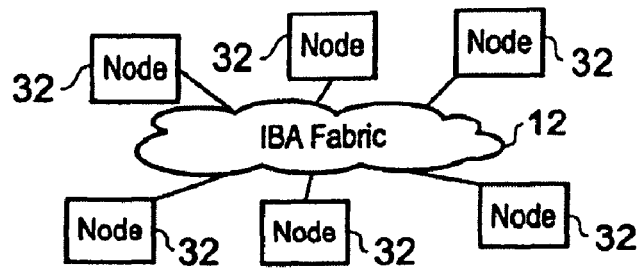
FIG. 2 is a schematic block diagram of a simplified arrangement of an InfiniBand™ Architecture system.
Figure 3:
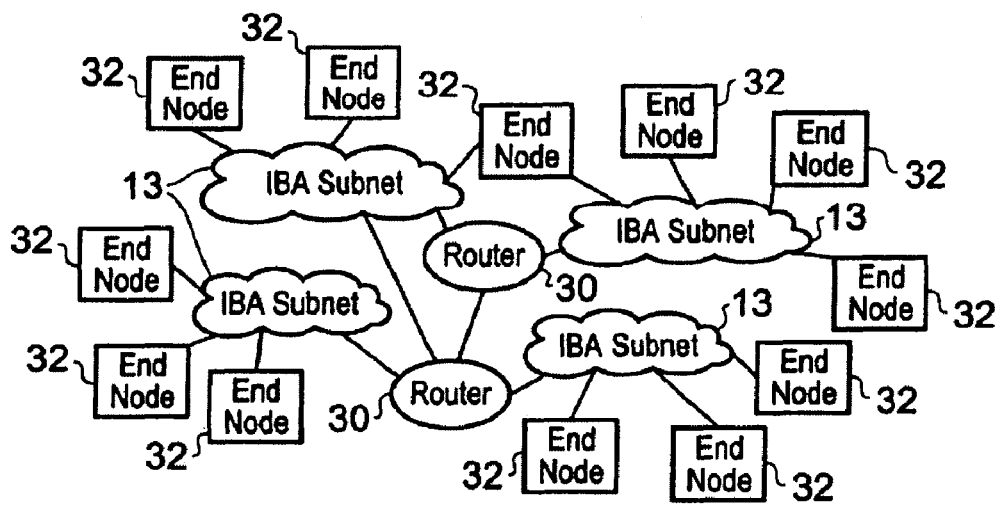
FIG. 3 is a schematic block diagram of another simplified arrangement of an InfiniBand™ Architecture system.
Figure 4:
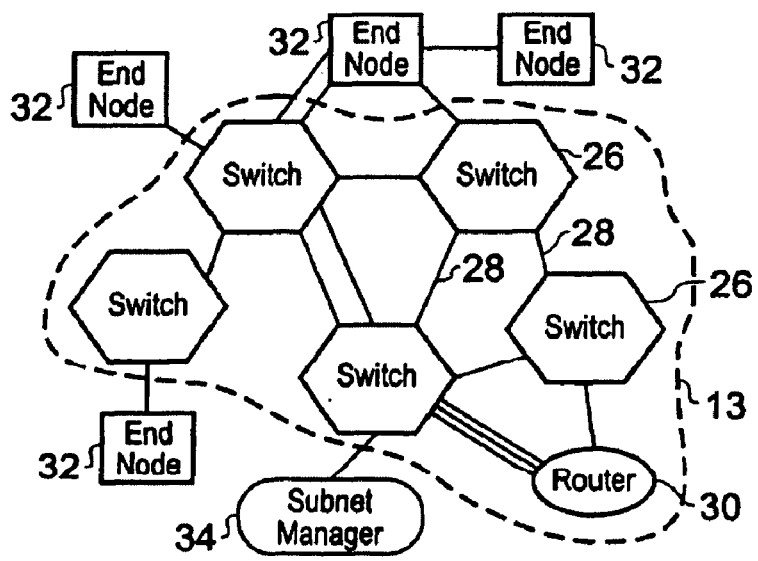
FIG. 4 is a schematic block diagram of a further simplified arrangement of an InfiniBand™ Architecture system.

Examples of possible InfiniBand™ Architecture topologies are shown in FIGS. 2, 3 and 4. FIG. 2 shows a high level simplified topology example where a number of endnodes 32 are interconnected by the fabric 12. An InfiniBand™Architecture network may be subdivided into subnets 13 interconnected by routers 30 as illustrated in FIG. 3. Any particular endnode 32 may be attached to a single subnet 13 or to multiple subnets 13. Shown in FIG. 4 is an example of the structure of a subnet 13. The subnet 13 comprises endnodes 32, switches 26, routers 30 and subnet managers 34 interconnected by links 28. Each endnode 32 may attach to a single switch 26, multiple switches 26 and/or directly with each other. In the case of direct connection between endnodes 32, the two or more directly linked endnodes effectively form an independent subnet with no connectivity to the remainder of the devices attached to the main subnet and one of the interconnected endnodes functions as the subnet manager for that link.

Figure 5:
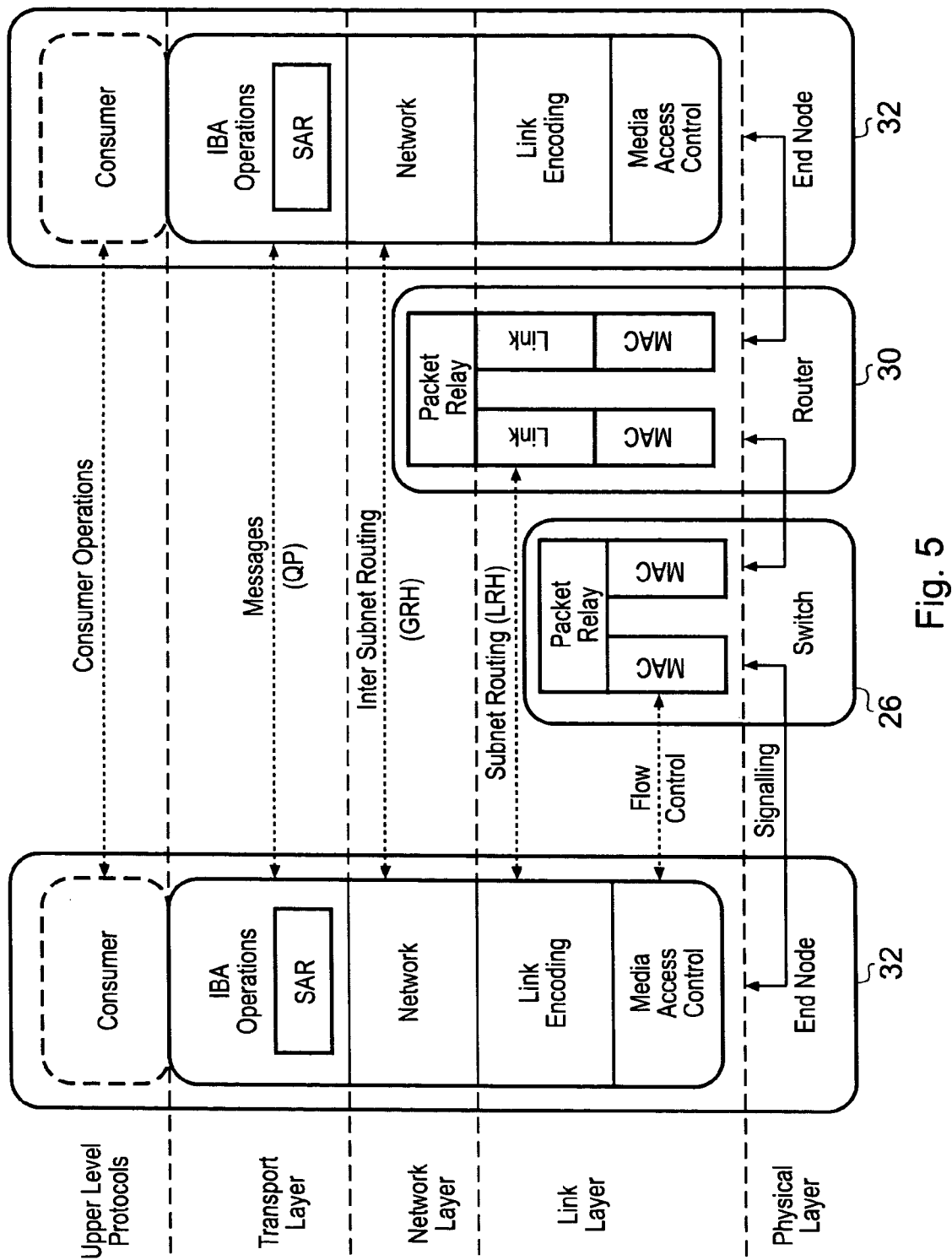
FIG. 5 shows a schematic illustration of the architecture layers of an InfiniBand™ Architecture system.

Referring now to FIG. 5, there is shown an illustration of the architecture layers of an InfiniBand™ Architecture system. Starting with the physical layer, this specifies how bits are placed onto the interconnections 28 and defines the symbols used for framing (i.e. start of packet and end of packet), data symbols and fill between packets (idles). It also specifies the signalling protocol as to what constitutes a validly formed packet (i.e. symbol encoding, proper alignment of framing symbols, no invalid or non-data symbols between start and end delimiter, no disparity errors, synchronisation method, etc.). The signalling protocol used by the InfiniBand™ Architecture utilises a differential signal. The physical (or ethereal) interconnects 28 between nodes of an InfiniBand™ Architecture network are normally provided by electrical signal carriers such as copper cables or optical signal carriers such as optical fibres. As discussed above, the maximum data rate of the interconnect is limited by the bandwidth of the selected channel. The physical layer also includes de-skewing circuitry for compensating for skew latency in the channels.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

The data packet format is illustrated in FIG. 7. Packets may be one of two types, IBA (InfiniBand™ Architecture) Packets or RAW (non-InfiniBand™ Architecture) Packets. IBA Packets have IBA defined transport headers, are routed on InfiniBand™ Architecture fabrics 12, and use native InfiniBand™ Architecture transport facilities. Raw Packets may be routed on IBA fabrics but do not contain InfiniBand™ Architecture transport headers. From the InfiniBand™ point of view, these packets contain only InfiniBand™ routing headers, payload and CRC. InfiniBand™ Architecture does not define the processing of these packets above the link and network layers. These packets can be used to support non-InfiniBand™ Architecture transports (e.g. TCP/IP, IPX/SPX, NetBUI etc) over an InfiniBand™ fabric.

The Link Layer describes the packet format and protocols for packet operation, e.g. flow control and how packets are routed within a subnet between the source and the destination. Packets may be data packets which convey data between endnodes and which consist of a number of different headers which may or may not be present. Alternatively packets may be Link Management Packets which are used to train and maintain link operation. These packets are used to negotiate operational parameters between the ports at each end of the link such as bit rate, link width, etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sourcing data packets. The receiver is the consumer of the data packets.

Each end of the link has a transmitter and a receiver. The InfiniBand™ Architecture utilises an "absolute" credit-based flow control scheme. That is to say that InfiniBand™Architecture receivers provide a "credit limit". A credit limit is an indication of the total amount of data that the transmitter has been authorised to send since link initialisation.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The InfiniBand™ Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the Link Layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The Network Layer, which is present only within routers 30 and endnodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header but the source and destination port identities are not changed and are protected by the Invariant Cyclic Redundancy Check. Thus the Network and Link Layers operate together to deliver a packet to the desired destination.

The Transport Layer, which is present only within endnodes 32, delivers the packet to the proper Queue Pair within the Channel Adapter of the destination endnode 32 and instructs that Queue Pair as to how the packet's data should be processed. The transport layer also has responsibility for segmenting an operation into multiple packets when the message's data payload is greater than the maximum payload carryable by a single packet. The receiving Queue Pair then reassembles the data from the multiple packets at the destination endnode 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write, etc). A number of Extended Transport Headers (ETH) may be present conditional on the class of service and operation code.

The Packet Sequence Number is initialised for a given Queue Pair as part of the communications establishment process and increments each time that Queue Pair creates a new packet. The receiving Queue Pair tracks the received Packet Sequence Number to determine whether any packets have been lost. For reliable service, the receiver endnode 32 may transmit an acknowledge signal back to the originator endnode to indicate whether all packets have been received successfully.

The Upper Level Protocols are completely software based and may comprise any number protocols used by various user consumers. The payload is the data carried by the packet and I Data is handling data associated with a work activity to be performed on the payload. Also present in the Upper Level protocols are Subnet Management and General Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an endnode 32.

Figure 8:
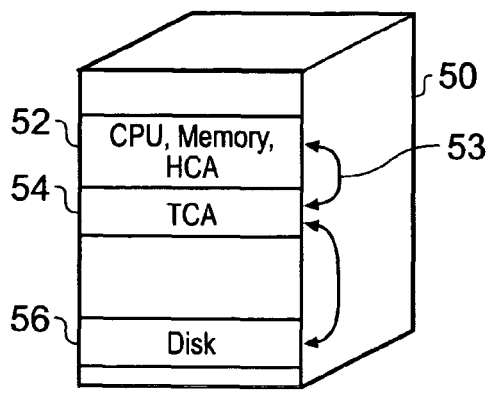
FIG. 8 is a schematic block diagram showing an arrangement where the InfiniBand™ Architecture is used to interconnect components within a computer system.
Figure 9:
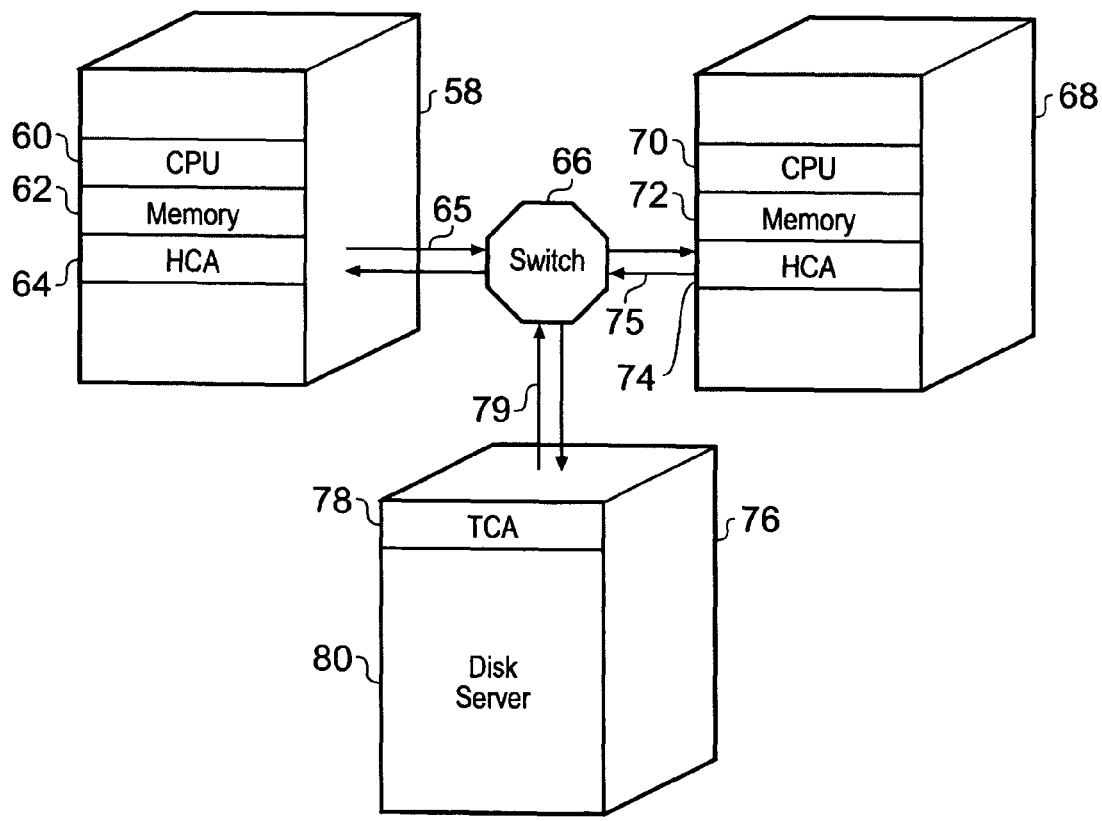
FIG. 9 is a schematic block diagram showing an arrangement where the InfiniBand™ Architecture is used as an interconnect between computer systems.

Examples of simple InfiniBand™ Architecture systems are shown in FIGS. 8 and 9. FIG. 8 shows an arrangement where the InfiniBand™ Architecture is used to interconnect components within a standard computer system chassis (also known as a rack) 50. In this example, the CPU, Memory and a Host Channel Adapter 52 are interconnected using conventional non-InfiniBand™ Architecture techniques. The Host Channel Adapter of the CPU, Memory and Host Channel Adapter 52 communicates via an InfiniBand™ Architecture interconnect 53 with a Target Channel Adapter 54. The Target Channel Adapter 54 communicates with a disk drive unit 56 via a SCSI (Small Computer System Interface) connection. Thus the InfiniBand™ Architecture is configured in this example to facilitate communications between elements of the same computer system.

FIG. 9 shows an arrangement where the InfiniBand™ Architecture is used only as an interconnect between computers. In this example a first computer system is mounted in a chassis 58 and comprises a CPU 60, memory 62 and a Host Channel Adapter 64 interconnected via conventional non-InfiniBand™ Architecture techniques. Via the Host Channel adapter 64, the first computer system communicates to and from a Switch 66 across interconnects 65. Also connected to the Switch 66 is a second computer system mounted in a chassis 68 and comprising a CPU 70, memory 72 and a Host Channel Adapter 74 which connects to the switch 66 via interconnects 75. Data storage for the first and second computer systems is provided by a disk server 80 mounted in a chassis 76. The disk server 80 connects with a Target Channel Adapter 78 also mounted within the chassis 76 by conventional non-InfiniBand™ Architecture techniques. The Target Channel Adapter 78 connects to the switch 66 via interconnects 79. Thus the InfiniBand™ Architecture is configured in this example to facilitate communication between more than one distinct computer systems. There is no limitation that the techniques of the examples of FIGS. 8 and 9 should be practiced separately, a computer system using the InfiniBand™ Architecture for internal communications may also be connected to other computer systems via a network based on the InfiniBand™ Architecture.

Thus there has now been described an overview of the InfiniBand™ Architecture for computer networking with examples of how it may be put into practice. Further details may be found in the above referenced InfiniBand™ Architecture Specification Volumes 1 and 2, available from the InfiniBand™ Trade Association, the contents of which are hereby incorporated herein by reference.

Fault Zones

Figure 10:
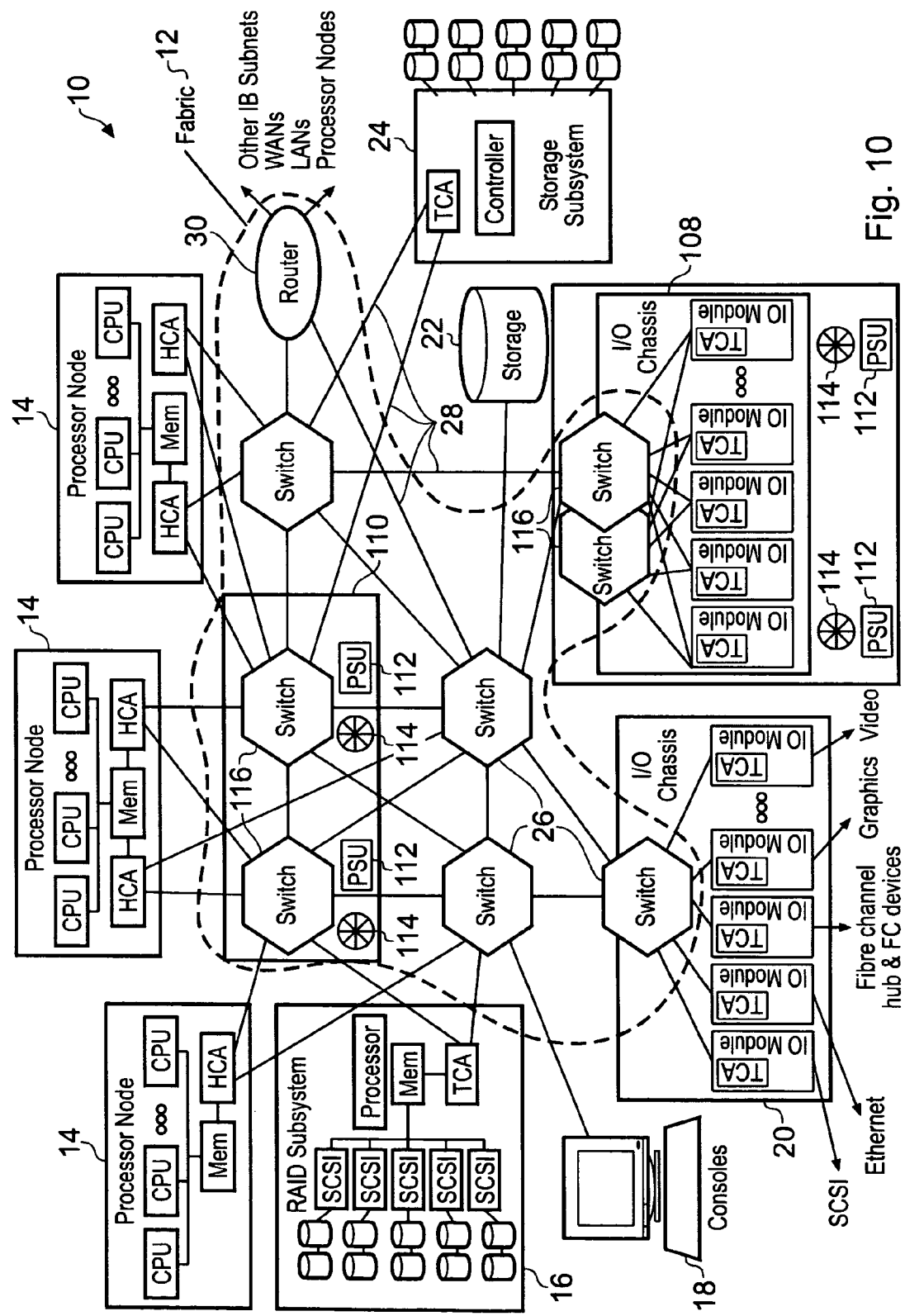
FIG. 10 schematically illustrates computing system elements of an InfiniBand™ network showing cooling and power supply components.

An InfiniBand™ fabric, and in principle any interconnect environment, is a collection of physical enclosures that contains switch nodes and various kinds of bridges and endnodes. Within the InfiniBand™ architecture technology such enclosures are known as chassis, examples of which are illustrated in FIGS. 8 and 9 housing computer systems, storage media and InfiniBand™ communication modules such as host channel adapters and target channel adapters. Another example is illustrated in FIG. 10 in which an I/O chassis 108 houses switches 116, power supply units 112 and cooling fans 114. A further example is chassis 110, which houses two switches 116 together with power supply units 112 and cooling fans 114.

Referring now to I/O chassis 108, each component, TCA module, power supply unit, fan or switch, is removably mounted within the chassis. Such components can be referred to as Field Replaceable Units (FRUs), since they can be replaced without having to return the chassis to the manufacturer or specialist repair shop, for repair, i.e. they can be replaced "in the field." Configuring as many of the components of a chassis as possible as FRUs is desirable since it facilitates repair and maintenance of the chassis.

Chassis components, e.g. FRUs, can be used by more than one other component or resource. Such sharing of FRUs can be explicit in that two paths share a single switch or it can be implicit in that a component depends on some other component, for example a power-supply or cooling fan. Hence if two switch FRUs for example share the same power supply, then those switch FRUs will not be independent and paths going through either switch will not be independent. Additionally, the independence of components may change, such that two hitherto independent components become dependent upon a single point of failure.

Such a situation may be described with reference to chassis 110 of FIG. 10. In chassis 110, two switches 116 share power supply units 112 and cooling fans 114. The power supply units and cooling fans introduce an element of redundancy into chassis 110, and the switches can be considered independent since they do not share any dependency on a single component. However, should either one of power supply unit 112, or either one of cooling fan 114 fail, then switches 116 will no longer be independent since they will be sharing a dependency upon a single component, namely the remaining operational power supply unit or cooling fan.

Where a chassis includes multiple FRU nodes, for example a pair of switches 116 such as illustrated in chassis 108 of FIG. 10, different port groups may be made independent of each other. Each switch has a port group for communicating over the InfiniBand™ interconnect fabric 12. Each TCA module of chassis 108 is connected to both of switches 116. If one of the switches should fail, the other switch, i.e. port group, is still operational. Providing the failure of one switch does not impact on the traffic between any pairs of ports that do not belong to that switch, then paths which do not go through the failed switch can be considered independent of that switch.

In addition to the internal dependencies within a chassis as described above, a set of chassis may share external components, for example uninterruptible power supply (UPS) units, firewall containers, or even the room in which the chassis are placed. For some implementations, such external factors are also considered when determining whether or not paths through an interconnect fabric are independent of each other.

An interconnect environment operating in accordance with the InfiniBand™ architecture is managed by a Fabric Manager 130 which includes the functionality of a subnet manager. The Fabric Manager 130 manages the interconnect fabric 12 itself, and the various nodes interconnected by the InfiniBand™ fabric.

Figure 11:
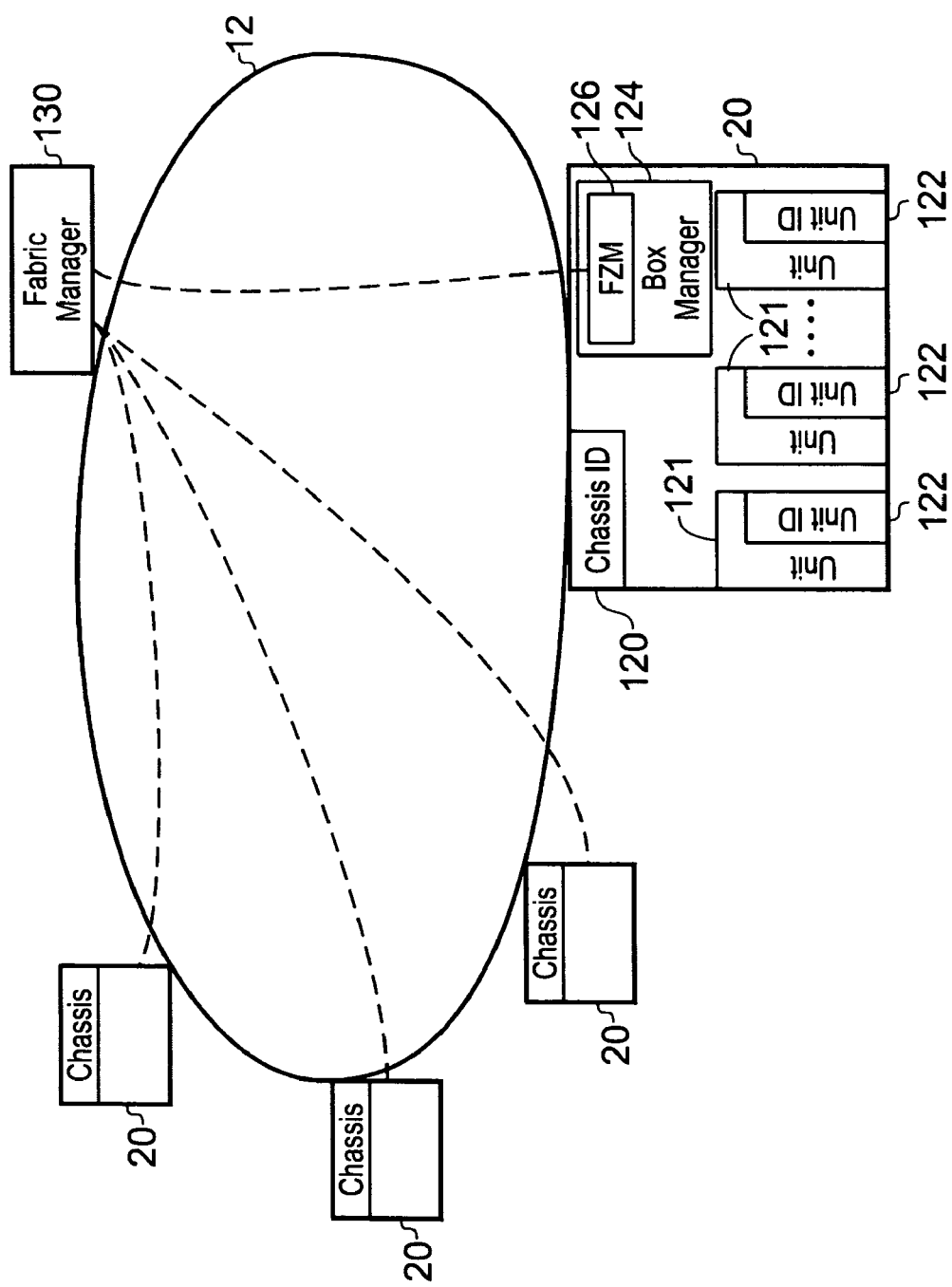
FIG. 11 schematically illustrates the management architecture of an InfiniBand™ network according to one example.

FIG. 11 is a schematic illustration of the fabric management architecture, which shows a number of generic switch chassis 20 interconnected by way of the InfiniBand™ fabric 12. The components of chassis 20 are illustrated generically and comprise FRUs 121, each FRU having a unit ID 122. The chassis itself has a chassis ID 120. Associated with a specific chassis or component enclosure ("box") is a logical entity known as a Box Manager 124. The Box Manager 124 is a software module which manages the various components within a chassis 20, and their interrelationship. For example, the Box Manager 124 keeps track of the state of the components within the chassis, as well as the dependencies between various components, that is to say, FRUs 121 themselves and also individual components on the units 121. The Box Manager 124 may run on a suitable computing platform provided in chassis 20, or run on a computing platform located elsewhere in the InfiniBand™ subnet fabric 12, yet associated with a particular chassis 20. In one embodiment the Box Manager 124 operates on one or more co-operating computing platforms within the chassis, for example one or more cooperating instances of a service processor.

In the described example, each Box Manager 124 includes a fault zone definition module (FZM) 126. The fault zone definition module 126 determines the dependencies between various components within the chassis in order to determine which components share dependency or have a common dependence and groups those components together logically to define a fault zone.

A Fabric Manager 130 communicates with the Box Managers 124 using in-band communication over the InfiniBand™ fabric 12. The Fabric Manager 130 is a logical entity that can explore, determine and keep track of the connectivity of the fabric, for example the ports on IB nodes within the InfiniBand™ fabric, and establishes routes through the fabric. The routes are defined by the Fabric Manager in order to clearly establish communication paths between pairs of ports on respective nodes. The Fabric Manager 130 handles route management and connectivity by the setting up of routing tables in the switches 26 and routers 30 of the fabric 12. The Fabric Manager 130 operates from one or more ports within the fabric.

In one example, the Fabric Manager 130 communicates with the fault zone mechanism 126 of the Box Manager 124 over the InfiniBand™ fabric 12 in order to receive information about the fault zones defined by the fault zone mechanism 126 for chassis 120, for use in preparing routing tables. In one example, communication between the Fabric Manager 130 and Box Manager 124 is by way of a Sun Microsystems, Inc. private protocol in-band via the InfiniBand™ fabric 12.

Box Manager 124 includes software for identifying FRUs 121 of chassis 120 which share a point of dependency. Each FRU having a common dependency is assigned the same fault zone number. In this manner, the software provides a fault zone definition mechanism 126 for determining fault zones within chassis 120. These fault zones can then be communicated across the IB fabric 12 to Fabric Manager 130. The fault zone definition mechanism 126 is not necessarily solely implemented in software, but may also be implemented as firmware or hardware, or any combination of two or more of software, firmware and hardware. The term mechanism is intended to include all such possible implementations.

Figure 12:
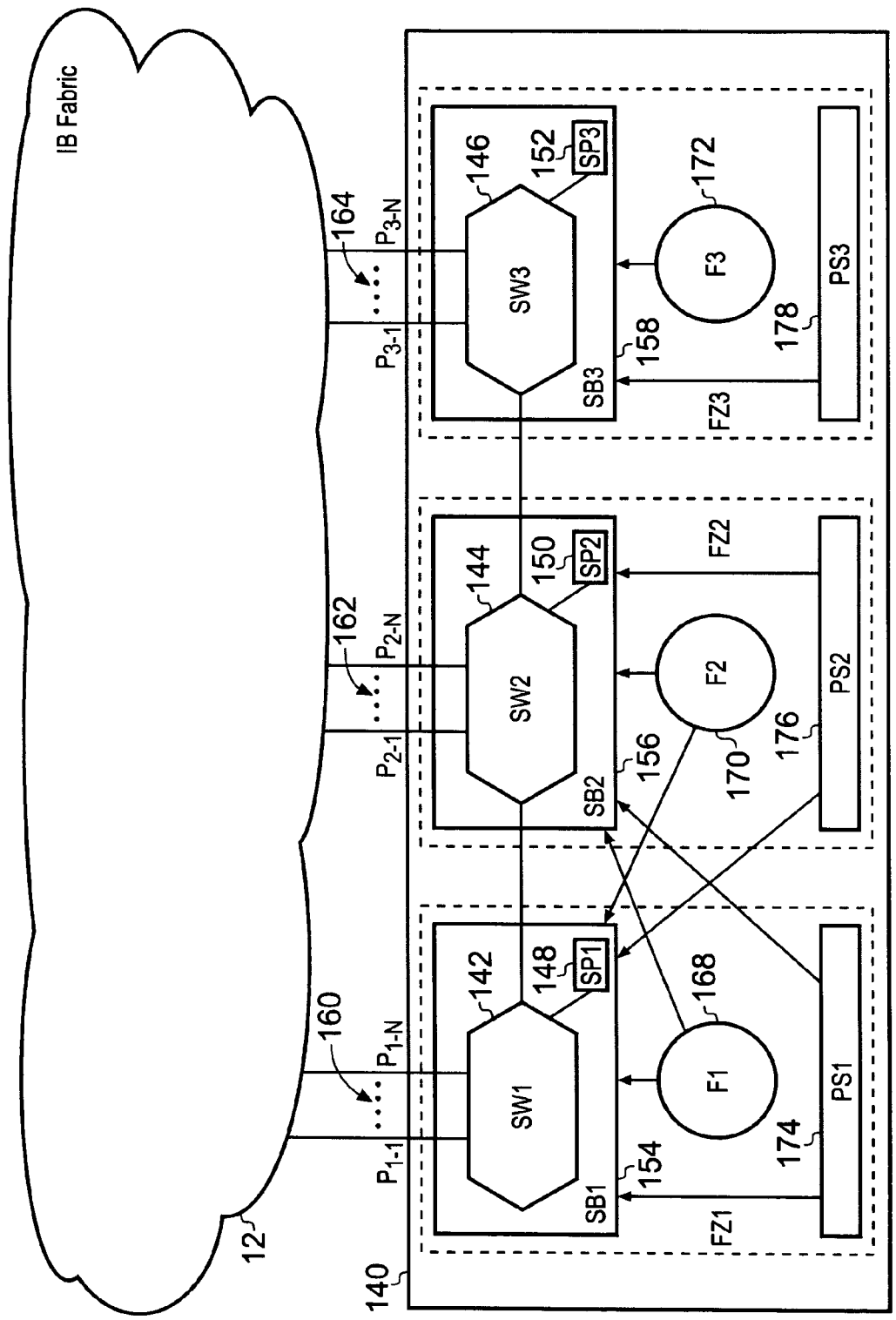
FIG. 12 schematically illustrates the components of a chassis forming a switch node.
Figure 13:
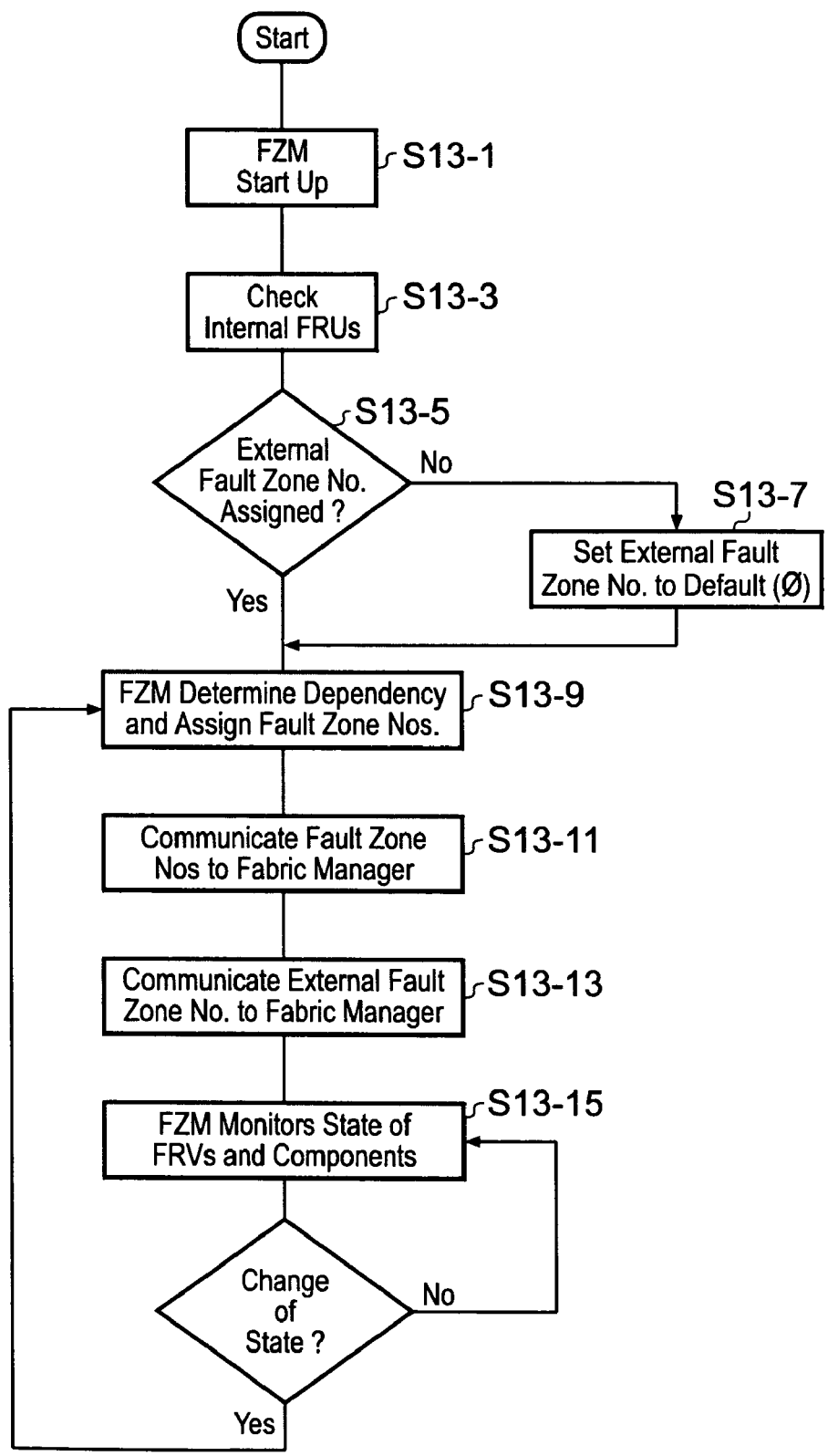
FIG. 13 is a flow diagram illustrating the operation of a fault zone definition mechanism according to one example.

An example of a particular implementation of a fault zone definition module will now be described with reference to FIG. 12 and FIG. 13 of the drawings. FIG. 12 is a more detailed schematic illustration of a chassis and its components, and FIG. 13 illustrates a flow diagram for a fault zone definition mechanism 126 operable for the chassis illustrated in FIG. 12.

The chassis 140 illustrated in FIG. 12 comprises one or more Infiniband (switch) nodes, each including switches 142, 144 and 146. Each switch unit also includes a respective service processor 148, 150 and 152. Respective switch units 142, 144 and 146, together with respective associated service processors 148, 150 and 152, are each mounted on a FRU SB1 (154), SB2 (156) and SB3 (158) capable of being easily inserted and removed from the chassis. Such a FRU suitable for switch nodes in an InfiniBand™ interconnect environment is supplied by Sun Microsystems, Inc and is known as a switch blade. Although in the illustrated example there is one IB switch per FRU SB1, SB2 and SB3, the ordinarily skilled person would readily understand that each of SB1, SB2 and SB3 may include more than one IB switch.

Each switch has a number of ports respectively labelled 160, 162 and 164 for switches 142, 144 and 146, providing connectivity to the InfiniBand™ fabric 12.

Chassis 140 additionally includes a number of other FRUs. For example, each switch blade 154, 156 and 158 is temperature controlled by way of respective fans 168, 170 and 172, and are supplied with power from respective power supplies 174, 176 and 178. The fans and power supplies themselves are typically implemented as FRUs. To aid identification and management of FRUs within a chassis, each location of the chassis which is configured to receive a FRU (the location may be a slot, socket, retaining clip or other receiving location) can be identified by a FRU receiving location number (frulocno).

In the example illustrated in FIG. 12, switch blades 154 and 156 are dependent on fans 168 and 170 for cooling, and power supplies 174 and 176 for power. However, switch blade 158 is reliant solely on fan 172 and power supply 178. The broken lines in FIG. 12 indicate groups of components which can be considered separate fault zones when all the components are operational. The solid lines between internal switches 142, 144 and 146 indicate that the switches are connected to each other with one or more links.

In the present example, each switch blade includes a service processor which runs the various software for controlling the operation of the switch blade itself and for monitoring its environment.

Each field replaceable unit (FRU) of chassis 140 has a unit identifier "ID", which shall be referred to in this description by referring to the alpha labels used in FIG. 12. For example, power supply 174 has the identity "PS1" and fan 170 has the identity "F2".

A Box Manager 124 stores FRU location information (FRU locations) which includes FRU location descriptions. The FRU location descriptions for the FRU locations containing SB1 and SB2 both include a FRU Location Dependency Set (FLDS) that specifies the FRU locations of PS1 and PS2 and a FLDS that specifies the FRU locations of F1 and F2. Further detail regarding the FLDSs will be given with reference to FIGS. 17 to 19 below.

The FRU location descriptions for the FRU locations containing SB3 include two FLDS sets containing the FRU location for PS3 and F3 respectively. The FRU descriptions for SB1, SB2 and SB3 each specify an entity list with a single member (the switches SW1, SW2 and SW3 respectively), and hence they are all client FRUs. The other FRUs in chassis 140 are all pure service FRUs, and do not need to be described in detail.

The Box Manager 124 starts up on the various service processors 148, 150 and 152 within chassis 140. The fault zone definition mechanism 126 also starts up on the various service processors as part of the Box Manager 124. The fault zone definition mechanism 126 determines the relationship or dependencies of various FRUs within chassis 140 to each other. The fault zone definition mechanism 126 also monitors the status of each of the FRUs within the chassis. Information regarding the construction of chassis 140 is built into the Box Manager software 124, and the fault zone definition module 126 uses this information to identify dependencies between FRUs, and also individual components on FRUs. For example, the switches 142, 144 and 146 also have their own identity separate from the switch blade identity on which they respectively reside. The fault zone definition mechanism 126 collates this information and logically groups FRUs and components having a shared dependency, or single point of failure, into fault zones. In the example of FIG. 12 there are three independent fault zones, FZ1, FZ2 and FZ3. For all components and FRUs operational, each fault zone, shown enclosed in dotted outline, is independent of the others. The fault zone definition module communicates information about the fault zones to the Fabric Manager 130, and the Fabric Manager utilises this information for maintaining independent paths or connections through the InfiniBand™ fabric 12, or identifying independent resources for applications or services requiring independence of other parts of the environment.

At a system level, each chassis may also be assigned an external fault zone number. This fault zone number is known to the Box Manager 124, and represents the dependency of the chassis as a whole to other chassis in the InfiniBand™ subnet fabric. An example of two chassis sharing the same external fault zone number would be when they share the same Uninterruptible Power Supply (UPS). The external fault zone number may also include a "site ID", which identifies the physical location of the chassis. This provides for an external fault zone management process which can cover different geographic locations.

Thus there has now been described a computer system environment where system components can be grouped into fault zones to allow management of redundancy provisions within the system and environment. Thereby, fault tolerance specifications can be judged against actually available system conditions and routing and service management performed to enable the specifications to be met.

Fault Zone Definition

An example of the operation of Box Manager software including a fault zone definition mechanism will now be described with reference to the flow diagram of FIG. 13. At step S13-1 the fault zone definition module 126 initialises and starts up as part of the Box Manager 124. Fault zone definition mechanism start-up typically follows a power on of chassis 140. At step S13-3 the status of the internal FRUs for chassis 140 is checked to determine that they are all operational. If a fault is found on a FRU during start up, the FRU is marked as non-operational, and the ports of any IB nodes on the FRU are not enabled. Fault zone numbers are then assigned taking the failed FRU into consideration.

At step S13-5 the fault zone definition determines whether or not an external fault zone number has been assigned to chassis 140. This may be done by the fault zone definition mechanism inspecting internal stable or persistent storage for the chassis 140 for keeping track of various externally defined policy information which would define membership of any external fault zones. In the present example, if no fault zone number has been assigned then fault zone definition module 126 assigns the default external fault zone value of 0 to the chassis at step S13-7. In the illustrated example no external fault zone has been defined and so a zero value is assigned.

At step S13-9 the fault zone definition mechanism determines the dependency of various FRUs and components within chassis 140 in relation to each other. Those units and components which share a single point of dependency are logically grouped together and assigned a fault zone number. The determination and assignment of fault zone numbers is based on built-in information regarding the chassis construction which can be accessed by the Box Manager. In this example each internal switch SW1, SW2 and SW3 can be assigned a separate internal fault zone number 1, 2 and 3 respectively.

Responsive to interrogation by the Fabric Manager 130 the fault zone definition mechanism 126 communicates the internal fault zone numbers to the Fabric Manager at step S13-11. Typically, the fault zone numbers are associated with the chassis ID. For example, the relevant chassis ID can be included as part of the fault zone number for that chassis. Optionally, the Fabric Manager at 130 can be aware of the chassis ID with which it is communicating and only the fault zone numbers are returned to the Fabric Manager which then associates the fault zone numbers and chassis ID to give each fault zone number a unique ID.

At step S13-13 the external fault zone number is communicated to the Fabric Manager.

The fault zone definition mechanism monitors the state of the FRUs and individual components of chassis 140, step S13-15, and if a change of state of any of the FRUs or individual components occurs, process flow returns to step S13-9 where the inter-dependency of the remaining operational FRUs and components is reevaluated in light of the status change. Otherwise, process flow returns to step S13-15 where the FZM continues to monitor the status of FRUs and individual components.

Thus there has now been described an example of a box manager operable to configure a network node according to a fault tolerance specification through use of a fault zone definition mechanism.

Figure 14:
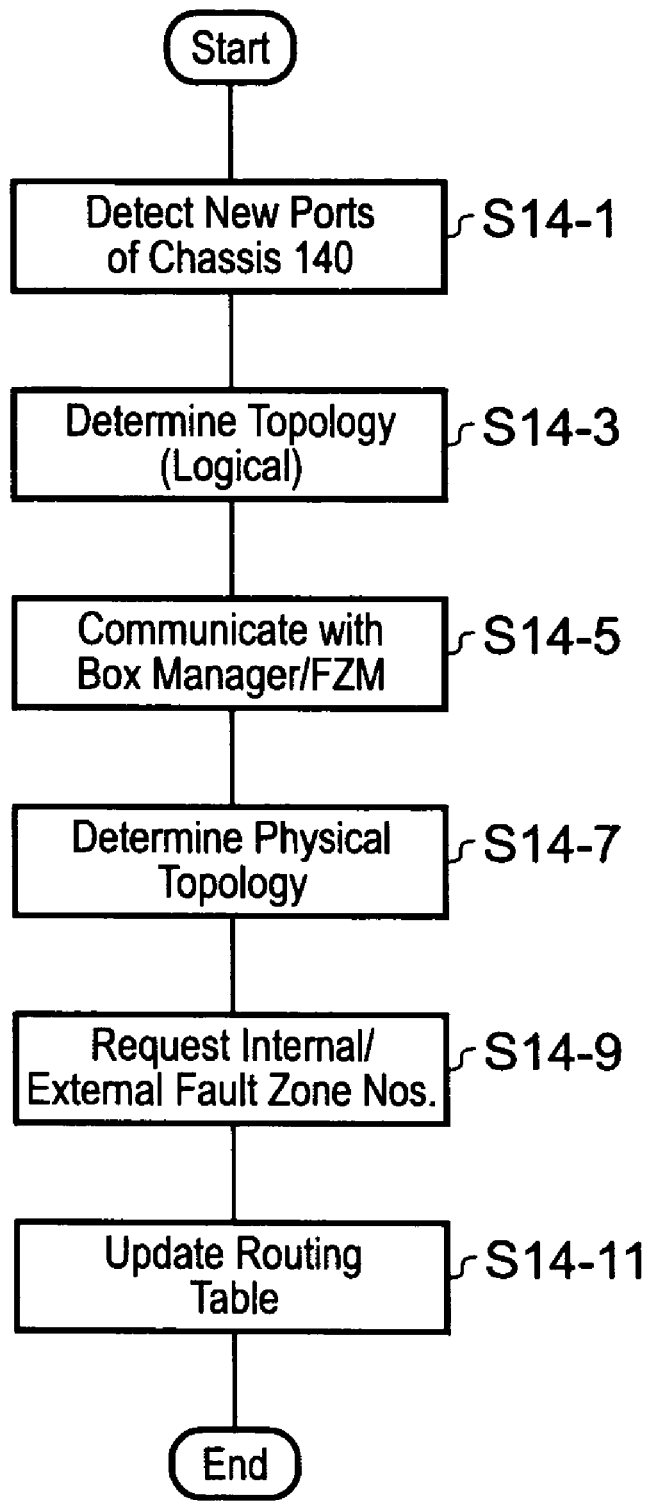
FIG. 14 is a flow diagram illustrating the operation of a Fabric Manager for one example of a fabric.

An example of the operation of the Fabric Manager 130 operable with the fault zone definition will now be described with reference to FIG. 14. The Fabric Manager 130 may be considered to be previously initialised, and managing other nodes within an interconnect fabric.

When chassis 140 is initialised and connected to the interconnect fabric 12, the Fabric Manager 130 detects the ports of chassis 140 as new ports for the interconnect fabric at step S14-1. At step S14-3, the Fabric Manager 130 determines the logical topology of the interconnect fabric 12 in terms of how the switches of chassis 140 are connected. Logical topology is based on Global Unique IDs defined as part of the Infiniband™ specification, associated with the new ports, and observed using the Infiniband™ specification defined subnet management mechanism.

At step S14-5, the Fabric Manager 130 communicates with the Box Manager 124 for chassis 140 via each of the newly connected ports. Such communication takes place using a suitable protocol. In the present example, the protocol uses extensions to the Infiniband defined "Baseboard Management" MAD class to implement queries, requests and notification regarding current state and dynamic state changes that affect the node availability and related fault zones within a chassis. An example protocol is described in greater detail below. Having established that it can communicate with the new ports, the Fabric Manager associates the new ports with the globally unique ID of chassis 140, thereby defining the physical connection of chassis 140 to the interconnect fabric 12 (i.e. the physical topology) at step S14-7.

At step S14-9, the Fabric Manager 130 requests from the fault zone mechanism, via the Box Manager, the internal fault zone numbers for each of the three switches corresponding to the new ports, and in the example of FIG. 12, receives values 1, 2 and 3 respectively. Additionally, the external fault zone number for chassis 140 is requested from the Box Manager 126. In the present example a zero value is returned indicating that no external fault zone number has been defined for chassis 140.

At step S14-11, the Fabric Manager 130 updates its routing table to take account of the new switches identified in chassis 140. In the present example, the Fabric Manager 130 is able to determine that there are three new switches which can be considered independent of each other, as well as independent of other nodes in the interconnect fabric, and can use this information for setting up independent (redundant) routes through the fabric.

Thus there has now been described an example of a fabric manager operable to work with a fault zone definition mechanism to configure a network node according to a fault tolerance specification.

Figure 15A:
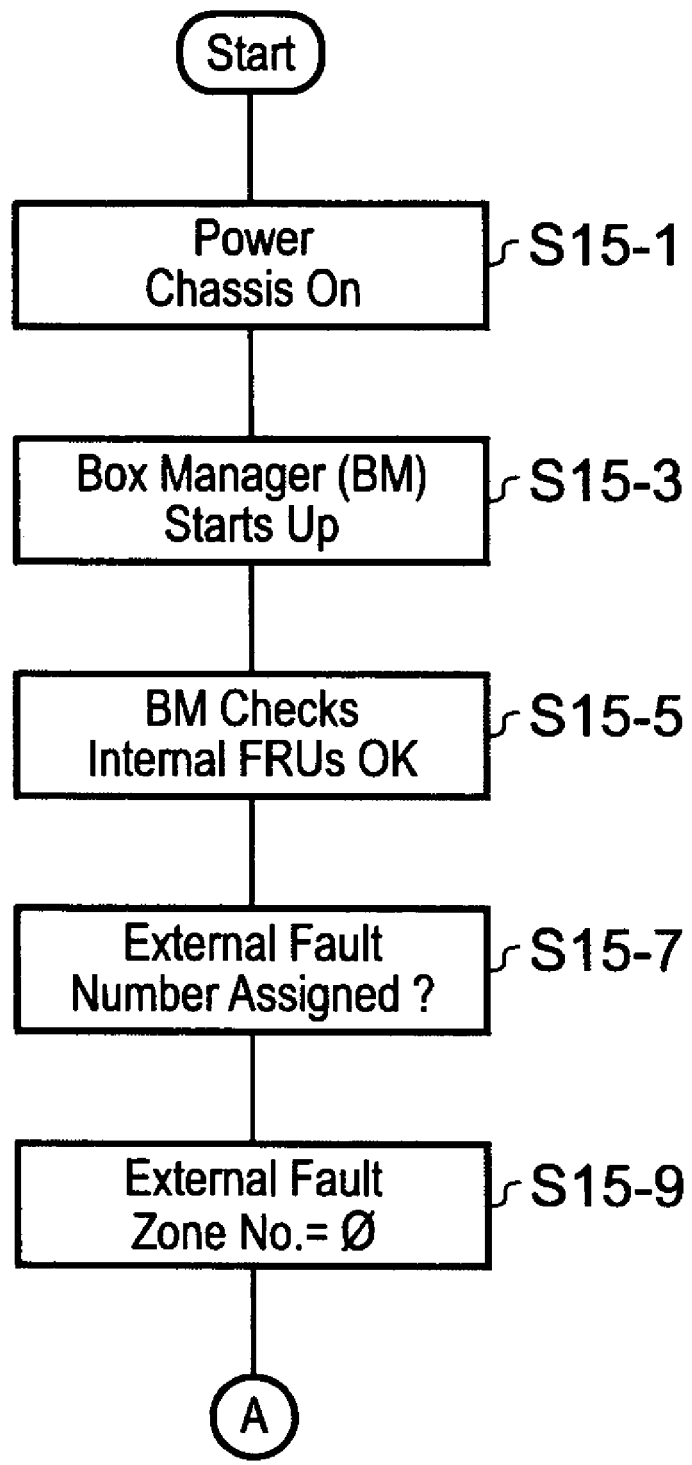
FIG. 15 is a flow diagram illustrating operations carried out in one example with reference to the chassis illustrated in FIG. 12.
Figure 15B:
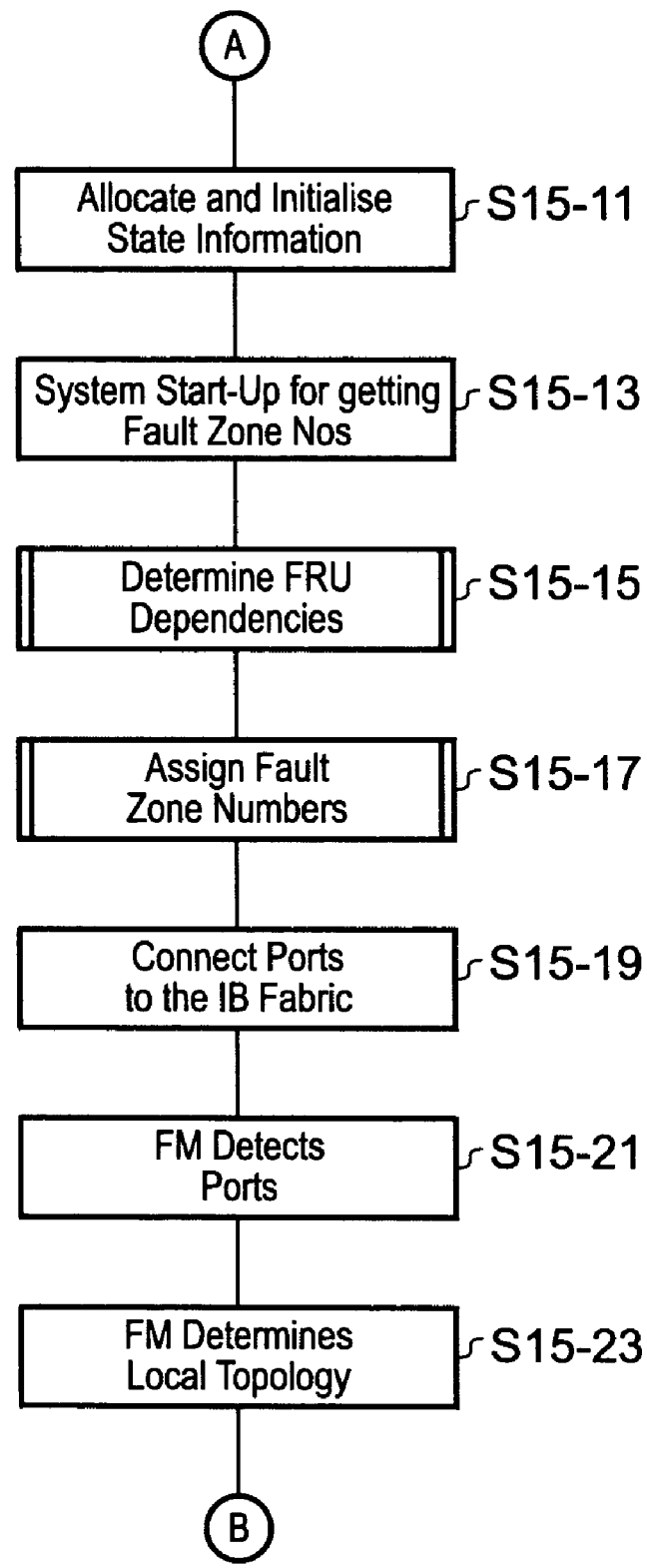
Figure 15C:
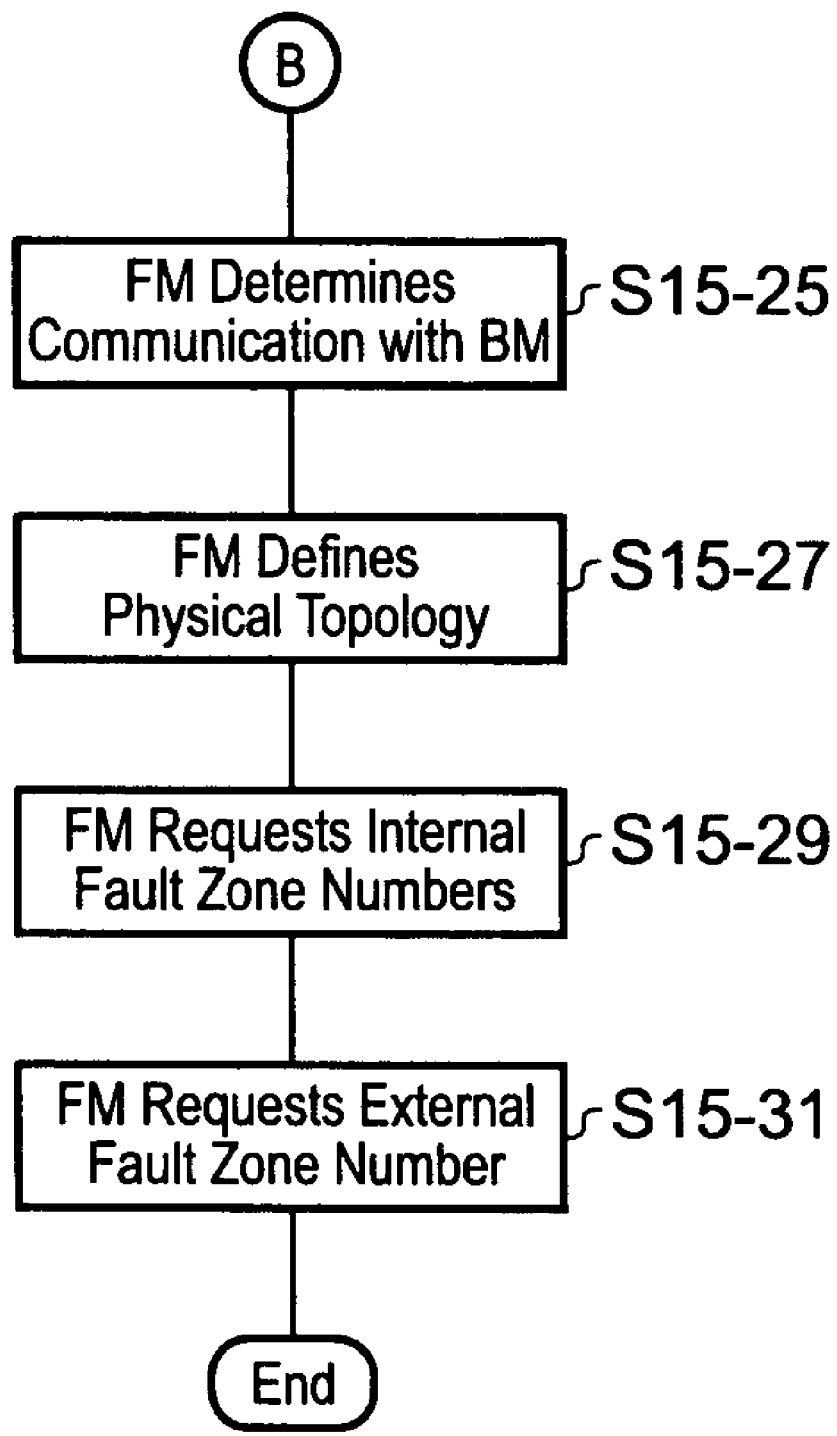

With reference to FIG. 15, there will now be described an example implementation of a fault zone definition mechanism.

At step S15-1, the chassis is powered on. Subsequently, at step S15-3, the Box Manager starts up on the various service processors within the chassis and at step S15-5 the Box Manager checks and determines that the state of all internal FRUs is ok.

At step S15-7, the Box Manager checks whether any external Fault zone number has been assigned to the chassis. This can be performed by inspecting internal persistent storage used for keeping track of various externally defined policy information.

In the present example, no external Fault zone number has been assigned, hence the Box Manager assigns the value zero at step S15-9, which in the present example indicates that no value has so far been assigned.

Following chassis start-up, the Box Manager 124 allocates and initializes the state information required by the fault zone definition mechanism at step S15-11. Then, at step S15-13 the Box Manager 124 performs a system startup algorithm on the state information in order to get initial fault zone numbers assigned to the relevant fabric entities (switches SW1, SW2 and SW3 in the present example).

The FRU dependency fault zone definition mechanism initiates a FRU dependency function at step S15-15 which function is used to determine FRU dependencies within the chassis. An example of a suitable function will be described below with reference to FIG. 20. In the present example, the algorithm determines that no single FRU dependency exists for SB1 or SB2, whereas SB3 has a single FRU dependency on both PS3 and F3. Since the client FRUs SB1 and SB2 have no single FRU dependencies, at step S15-17 a fault zone number assignment algorithm assigns the FRU location number of SB1 (SB1-frulocno) as Current Internal Fault zone Number for SW1 and the slot location number of SB2 (SB2-frulocno) as Current Internal Fault zone Number for SW2. An example of a suitable function will be described below with reference to FIGS. 21 and 22. Since the client FRU SB3 has a single FRU dependency on both PS3 and F3, it has a Single Service FRU Dependency List that consists of PS3 and F3. Since PS3 is the first element in the list, the Fault zone number assignment algorithm assigns the slot location number of PS3 (PS-frulocno) as the Current Internal Fault zone Number for SW3.

At step S15-19 all of the switch ports (ports P-1-1 through P-3-n in the present example) are connected to the fabric, and put into a state that makes them observable from the link side of the chassis. At step S15-21, the Fabric Manager detects the new ports on the fabric using Subnet Management mechanisms defined by the InfiniBand™ specification.

At step S15-23 the Fabric Manager determines the logical topology in terms of how the new switches are connected. This can be performed using Global Unique IDs associated with the ports/nodes defined by the Infiniband™ specification, observed using Subnet Management mechanisms defined by the Infiniband™ specification. Using a suitable protocol, the Fabric Manager determines at step S15-25 that it can communicate with the Box Manager for chassis 140 via each of the newly connected switch ports.

At step S15-27 the Fabric Manager 130 associates the discovered switches with the globally unique ID of chassis 140 (i.e. physical topology).

The Fabric Manager 130 then makes a request, at step S15-29, to the Box Manager 124 for internal Fault zone numbers for each of the discovered switches within chassis 140, and receives the values SB1-frulocno, SB2-frulocno and 3 respectively. Then, at step S15-31 the Fabric Manager 130 requests the external Fault zone number for chassis 140 from the Box Manager 124, and receives the value zero indicating no external Fault zone number has been defined. Since each switch in the example has a separate internal Fault zone number, and no external fault zone number is defined, the Fabric Manager 130 has now determined that the three newly discovered switches can be considered independent of each other, as well as of all other nodes in the fabric when setting up redundant (independent) routes through the fabric, and the set up process then ends.

Thus there has now been described a mechanism for set-up of fault zones within a chassis upon initialisation of that chassis. Thus an Infiniband fabric to which the chassis is connected can identify distinct fault zones for the purposes of providing a fault tolerant functionality to the fabric.

Example Fault Scenario

Figure 16:
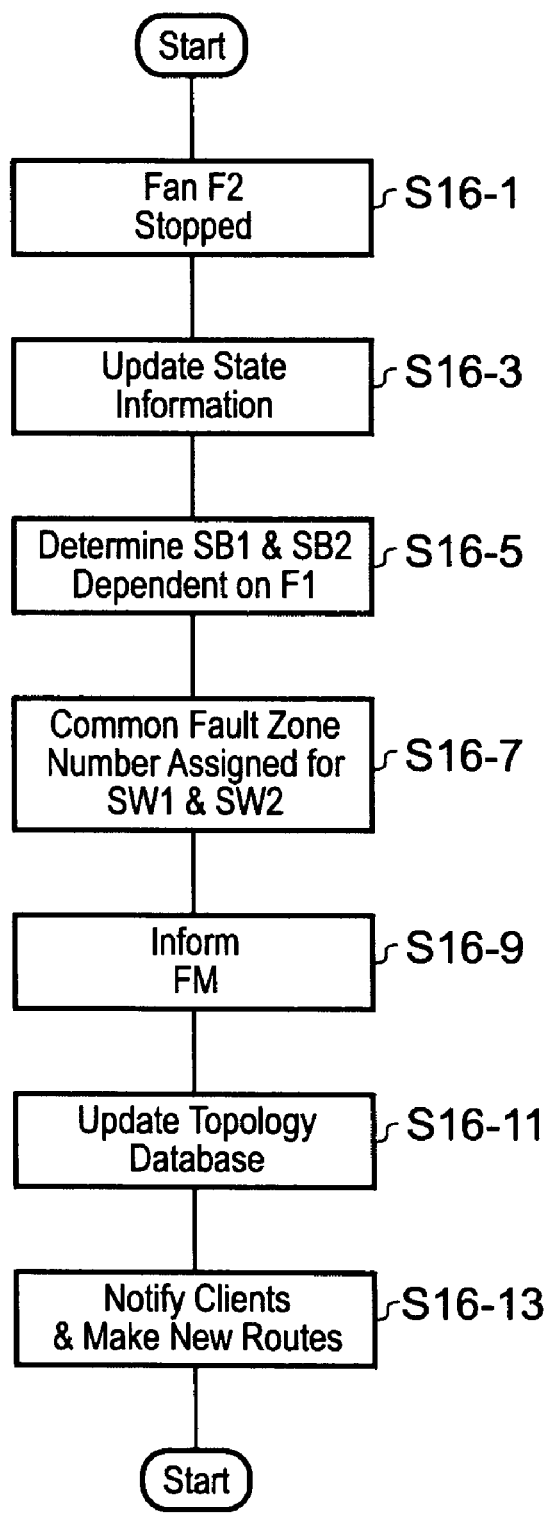
FIG. 16 is a flow diagram illustrating operations carried out in one example with reference to a fault occurring in the chassis illustrated in FIG. 12.

An example of a fault scenario causing fault zone changes will now be described with reference to the flow chart of FIG. 16. In this example, it is assumed that a chassis 140 has been configured according to the example of a fault zone definition mechanism described above with reference to FIG. 15.

The fault condition which occurs in the present example is a failure of fan F2.

At step S16-1, the Box Manager 124 notices that the fan F2 is not operating correctly. In the present example, the Box Manager 124 is configured to monitor the chassis FRUs on a regular basis to ensure that all such non-operational statuses are noticed as soon as possible after FRU failure. As the skilled reader will appreciate, the exact monitoring scheme implemented will depend upon at least two main considerations, these being a desire for maximum reliability and a desire for minimal cost and maximum simplicity of implementation. A balance between these two factors will lead to a monitoring arrangement somewhere between constant real-time monitoring for maximum reliability, but at high cost and complexity of implementation due to the processing capacity required to monitor each FRU on a real-time basis, and low-cost, simple monitoring at discrete (relatively large) monitoring intervals. The exact position along this scale which is achieved will depend upon the desired characteristics of a particular implementation.

At step S16-3 the Box Manager 124 registers a fault for fan F2 and performs a forced change and fault algorithm to update and report the state information.

At step S16-5 the fault zone definition mechanism 126 initiates the FRU dependency algorithm to determine that both SB1 and SB2 now have a single FRU dependency on F1. Hence both SB1 and SB2 now have Single service FRU lists containing F1.

At step S16-7 the Fault zone Number assignment algorithm determines that there is overlap between the Single service FRU lists of SB1 and SB2. Since F1 is the first (and in this simple case the only) member of the joined Single service FRU lists of SB1 and SB2, it assigns the location number of fan F1 (F1-frulocno) as the Current Internal Fault zone Number for both SW1 and SW2. Since the modified fault zone numbers represent externally visible changes, individual notification messages regarding the change in internal fault zone number for both SW1 and SW2 respectively are sent to the Fabric Manager 130 at step S16-9.

The Fabric Manager 130 updates its topology data base at step S16-11 to reflect that SW1 and SW2 are now dependent by sharing a Fault zone.

At step S16-13 the Fabric Manager 130 determines all routes that are affected by this change in dependency (i.e. potential loss of redundancy) and takes appropriate actions which may include:
  notifying affected clients using routes that are no longer redundant.
  making new routes (if possible) and informing relevant clients.

Thus there has now been described an example of a mechanism whereby a fault zone assignment is altered in response to a detection of a module failure within a chassis connected to an Infiniband fabric. Thus a loss of fault tolerance caused by the failure can be accounted for in routing algorithms and reliability determinations.

State Records

Figure 17:
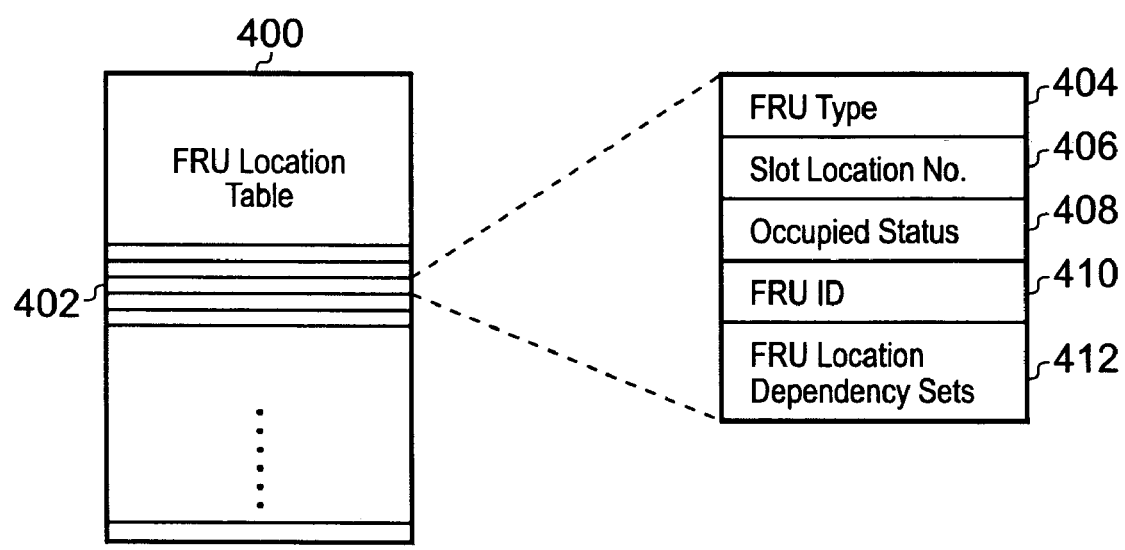
FIG. 17 is a schematic representation of a field replaceable unit location table for a box manager of one example.
Figure 18:
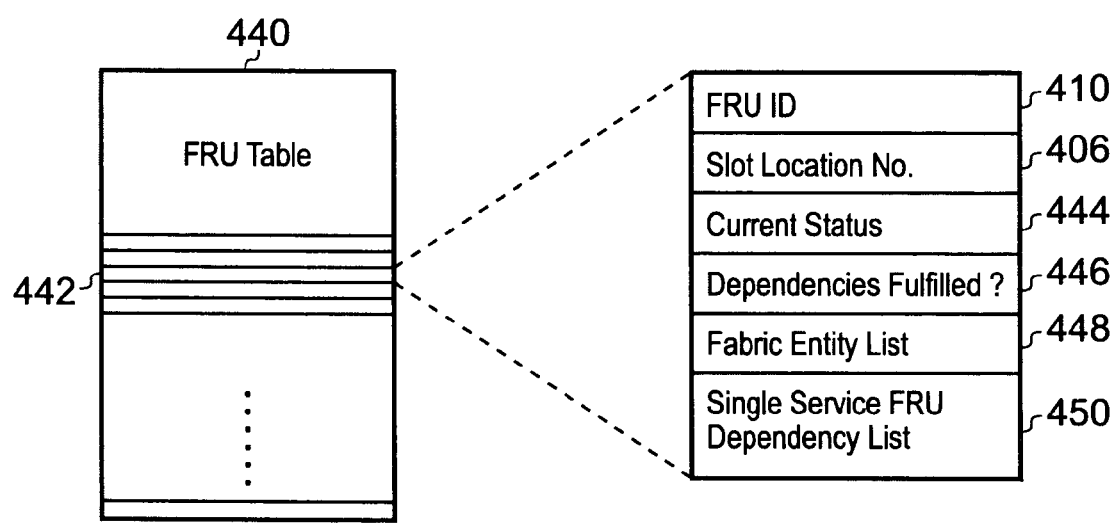
FIG. 18 is a schematic representation of a field replaceable unit properties table for a box manager of one example.
Figure 19:
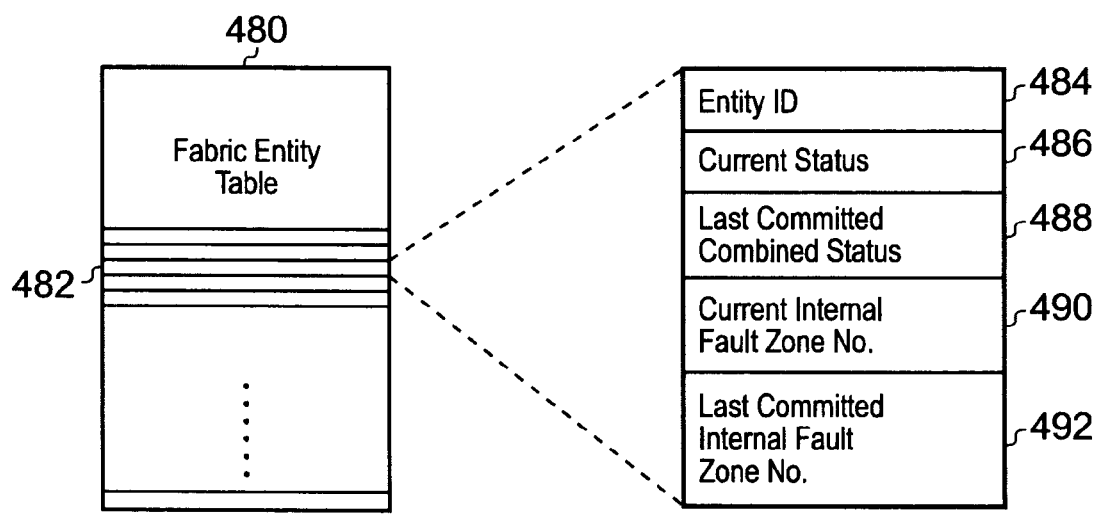
FIG. 19 is a schematic representation of a fabric entity table for a box manager of one example.

Examples of data structures suitable for maintaining the FRU information for use by the fault zone definition mechanism will now be described with reference to FIGS. 17 to 19.

The Box Manager keeps a list of FRU locations for use by the fault zone definition mechanism. Each FRU location is a location which can receive a FRU, and information can be kept for each location to identify the type of FRU that can be received at that location.

The box manager can also keep a variety of other information associated with each FRU location. This information can be stored in a table 400, as shown in FIG. 17, with one entry 402 for each FRU location, each entry can include:
  FRU type 404
  slot location number (unique within the chassis) 406
  occupied status (TRUE/FALSE) 408
  FRU ID (if occupied) 410
  A list of FRU Location Dependency Sets—FLDSs 412

Each such FLDS 412 represents a function or service that a FRU in this location would depend on in order to be operational. For each such FLDS the box manager can keep a list of (other) individual FRU locations that are mutually redundant relative to providing the required service for a FRU in this location. Hence, an operational FRU in at least one of the FRU locations in the list is sufficient to perform the function/service that this dependency set represents.

If a FLDS list and the locations specified in each FLDS of the present example are maintained by the Box Manager, then no other representation of the dependencies need be maintained to ensure that adherence to a predetermined fault tolerance specification is maintained. In some examples, the FLDS lists associated with the various FRU locations within a chassis can be an inherent part of the chassis hardware and/or embedded software and/or firmware.

An FLDS 412 may have only a single member in a chassis design where a set of FRUs are handled as a single point of failure (i.e. a kind of "Meta FRU"). Several such FRU sets should then have empty bisections though (i.e. so that the chassis design does not imply that a single point of failure is shared between such "Meta FRUs"). An example of such a "Meta FRU" might be a module such as a service processor which contains more than one FRU, but where each FRU within the service processor is interdependent whereby all of the individual FRUs making up the service processor must be present for this service processor to become operational. Thus there is no redundant "backup FRU" within a single instance of the service processor, but two disjointed sets of service processor FRUs may implement two independent and redundant service processor instances.

In order to express a FRU dependency set containing two such "Meta FRUs", it is possible to identify each such "Meta FRU" as a "virtual FRU location" that in its turn has dependency on its individual "sub-component FRUs". Alternatively, there can be defined several FRU dependency sets each containing pairs of FRU locations that represents the same "sub-component" within each Meta FRU. From some viewpoints the latter approach may be considered to be incorrect because it in principle gives the impression that individual sub-components from each "Meta FRU" can be combined to provide the desired function (i.e. despite the fact that it is not possible to combine sub-components from different Meta FRUs). In order to avoid this "misinterpretation" being reflected as a false redundancy assumption, the interdependency of sub-components is taken into account in examples using this approach. By doing this, any inoperable sub-component can cause also its fellow sub-components to become marked as not operational. The implementation of such an approach will use a dependency definition function that is extended beyond that discussed with reference to FIG. 15 in order to handle nested dependencies or perform a two-pass analysis so that the first pass will sort out all direct dependencies among sub-components, and the second pass will correct any false redundancy assumptions that may have been made during the first pass.

If FRU location X has a dependency on FRU location Y and FRU location Y in its turn has a dependency on FRU location Z, then, according to the present example, both location X and Y have FLDSs that contain Z. This arrangement avoids dealing with indirect (or nested) dependencies by a managing entity such as the Box Manager, thereby creating a simplified management scenario. Hence, as long as FLDS definitions are constructed in this manner, the management entities can implement functions which focus on sorting out dependencies of client FRUs without needing to spend processing resources considering indirect/nested dependencies through (potentially) several levels of service FRUs. (See the definitions of "client FRU" and "service FRU" below).

A simple example configuration where this issue applies is a chassis where a FRU containing a switch uses a power supply FRU that in its turn depends on cooling from one or more fan FRUs that has nothing to do with the cooling of the switch FRU. In this case the switch FRU would have a direct dependency on the fans that provides cooling for itself, but an indirect dependency on the fan that provides cooling for the power supply. However, in terms of FLDS definitions both set of fans would show up in different FLDSs for the switch FRU.

The box manager can also keep a list of FRUs present in the system. For each FRU present, further information can be kept. This information can be stored in a table 440, as shown in FIG. 18, with one entry 442 for each FRU, each entry can include:

FRU ID 410

Slot location number 406

Current operational status (OK/NotOK) 444. This is the status of the FRU itself, not taking any dependencies to other FRUs into account. The value is maintained by the Box Manager and is updated as the result of removal and disable operations as well as fault events.

Dependencies fulfilled (TRUE/FALSE) 446. This status is updated by the fault-zone definition module based on the status of the FRUs in the various sets that are associated with this FRU.

Fabric entity list 448. A list of fabric entities (components) that are part of the FRU, and that are to be reported with fault zone number to the Fabric Manager. If this list is empty, then the FRU is a pure "service FRU". If the list is not empty, then the FRU is counted as a "client FRU". (It should be noted that a client FRU can also represent services to other FRUs).

Single service FRU dependency list (SSFD List) 450. A list of (service) FRU instances that currently represent a single operational FRU within an FLDS that this FRU depends on (i.e. this FRU is the only operational FRU within the corresponding FLDS sets of client FRUs in the list).

The box manager can also keep a list of fabric entities present in the system. For each fabric entity present, further information can be kept. This information can be stored in a table 480, as shown in FIG. 19, with one entry 482 for each fabric entity, each entry can include:

Globally Unique ID 484

Current Operational status (OK/NotOK) 486. This status is updated as a result of disable operations or fault events that are specific for this entity. Hence, this status reflects the isolated status of the entity itself in the case where the entity can be non-operational independently of the rest of the FRU. However, an entity can not be operational if the corresponding FRU is not also operational.

Last committed combined operational status (OK/NotOK) 488. This status is "OK" if the values for "Current Operational Status" were OK for both the entity and the corresponding FRU, and the value for "Dependencies Fulfilled" for the corresponding FRU was TRUE at the time just after the last committed global status update.

Current Internal fault zone number (to be supplied/updated by the fault zone definition mechanism) 490

Last committed internal fault zone number 492. Copy of the value of "Current Internal fault zone number" at the time just after the last committed global status update.

The fault zone definition mechanism of the present example consists of two main functions, namely "FRU dependency definition" and "fault zone number assignment algorithm". These functions are generic and are based on information supplied by the platform specific parts of the Box Manager (e.g. operational status and FLDS sets).

In additional to the two main functions, the fault zone definition mechanism can also provide a set of support functions that for use in the implementation of the protocol between the Box Manager and the Fabric Manager.

Examples of the fault zone definition mechanism functions will now be described by way of pseudo-code description in combination with the accompanying figures.

FRU Dependency Definition Function

This function determines the dependencies of each FRU. As described above, step S15-15 can utilise a function of this type during the start-up process described with reference to FIG. 15.

Figure 20:
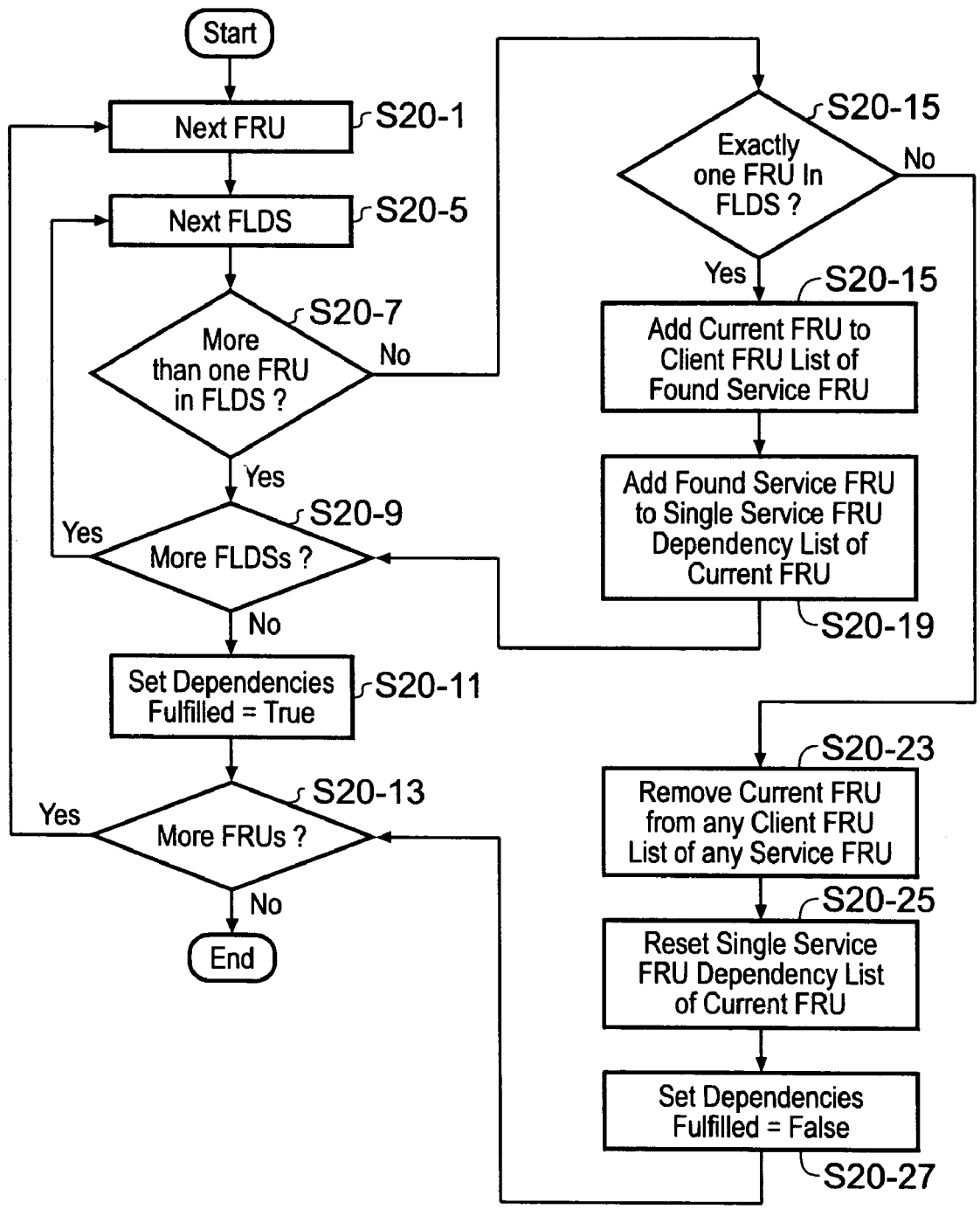
FIG. 20 is a flow diagram showing the operation of a dependency definition function.

As shown in FIG. 20, the function starts by selecting a next FRU at step S20-1. In the present example, an initial assumption is made that the current FRU does not have a dependency problem. Next, at step S20-5, a next FLDS of the FRU is selected, this FLDS is then analysed at step S20-7 to determine whether more than one operational FRU is identified in that FLDS. If it is determined at step S20-7 that more than one operational FRU is identified in the current FLDS, then since the FLDS represents more than a single operational FRU it cannot (at this time) represent a dependency to a shared single point of failure, and processing continues at step S20-9 where it is determined whether any more FLDSs remain to be processed for this FRU. If there are more FLDSs for this FRU, then processing returns to step S20-5 and a next FLDS is selected. If, on the other hand it is determined that no more FLDSs are to be processed then processing continues at step S20-11 where a characteristic DependenciesFulfilled is set to True, representing that the current FRU has no dependencies to a single shared point of failure. As this then completes the processing for the current FRU, a check is performed at step S20-13 to determine whether any more FRUs require processing. If more FRUs are present, processing returns to Step S20-1 where a next FRU is selected, otherwise the function ends.

On the other hand, it may be determined at step S20-7 that the current FLDS does not contain more than one FRU, then at step S20-15 a check is performed to determine whether the current FLDS contains exactly one operational FRU. If it is determined that exactly one operational FRU is in the FLDS, then processing continues at step S20-17 where the current FRU is added to the client FRU list of the service FRU identified in the FLDS. Next, at step S20-19, the service FRU identified in the current FLDS is added to the single service dependency list of the current FRU. This then concludes the processing for the current FLDS, so processing returns to step S20-9 where a check is performed to determine whether further FLDSs require processing, as discussed above.

Alternatively, it may be the case that at step S20-15 it was determined that the FLDS does not contain exactly one operational FRU. As it has already been determined (at step S20-7) that the FLDS does not contain more than one operational FRU, the FLDS must contain no operational FRUs. This means that the current FRU cannot operate as it is dependent upon a set of FRUs of which none are operational. Therefore, at step S20-23, the current FRU is removed from any client FRU list of any service FRU identified in any FLDS associated with the current FRU on which it is entered. Next, at step S20-25, the single FRU dependency list for the current FRU is reset. Finally the DependenciesFulfilled variable is set to False at step S20-27. Thus the current FRU, which has been identified as non-operable is removed from all lists indicating to other FRUs that it is available for use. Once a non-operable condition is detected in one FLDS for the current FRU, there is no point in examining other FLDSs for the current FRU as the current FRU will remain non-operable by virtue of its invalid dependency in the current FLDS. Accordingly, processing passes back to step S20-13 where a check is performed to determine whether any more FRUs require processing as described above.

The above-described process can also be expressed by means of the following pseudo-code. In the following listing, a variable DependencyFailure is used to represent the initial assumption of no dependency problems being present.

```
BEGIN (FRU dependency definition function):
FOR (each operational client FRU);
DependencyFailure=FALSE;
FOR (each FLDS in the FRUs FLDS list):
    IF (the FLDS represents more than a single operational
        FRU):
        {Since the FLDS represents more than a single opera-
            tional FRU, it can not (at this time) represent a
            dependency to a shared single point of failure}
    THEN continue to next FLDS in list;
    ELSE IF (the FLDS set contains exactly one operational
        FRU):
        {In this case, there has been identified a dependency
            of the current client FRU on a single service FRU
            instance}
    THEN add the current client FRU to the client FRU list
        of the found service FRU instance AND add the found
        service FRU instance to the single service FRU
        dependency list of the current client FRU;
    ELSE (i.e. the FLDS set contains no operational FRU)
        set DependencyFailure=TRUE;
        {The service that the FLDS represents is not avail-
            able, and the FRU is therefore not able to operate}
        {Since we already have detected an unfulfilled depen-
            dency, there is no point in checking the status for the
            remaining FLDS instances in the list}
        Exit the FLDS list loop;
    ENDIF
ENDFOR
IF (DependencyFailure):
    {Since the FRU is not able to operate, it should not be
        counted in any dependency relations}
    Remove the current FRU from any client FRU list of any
        service FRU instance;
    Reset the single FRU dependency list of the current
        FRU;
    set DependenciesFulfilled for the current FRU to
        FALSE;
ELSE
    Set DependenciesFulfilled for the current FRU to
        TRUE;
ENDIF
ENDFOR
END (FRU dependency definition function)
```

Fault Zone Number Assignment Function

This function assigns a fault zone number to each FRU. For the purposes of the accompanying Figures, this function has been divided into two parts, represented in FIGS. 21 and 22 respectively. As will be appreciated, and as illustrated in the pseudo-code below, a single function can provide both parts. As described above, step S15-17 can utilise a function of this type during the start-up procedure described above with reference to FIG. 15.

Figure 21:
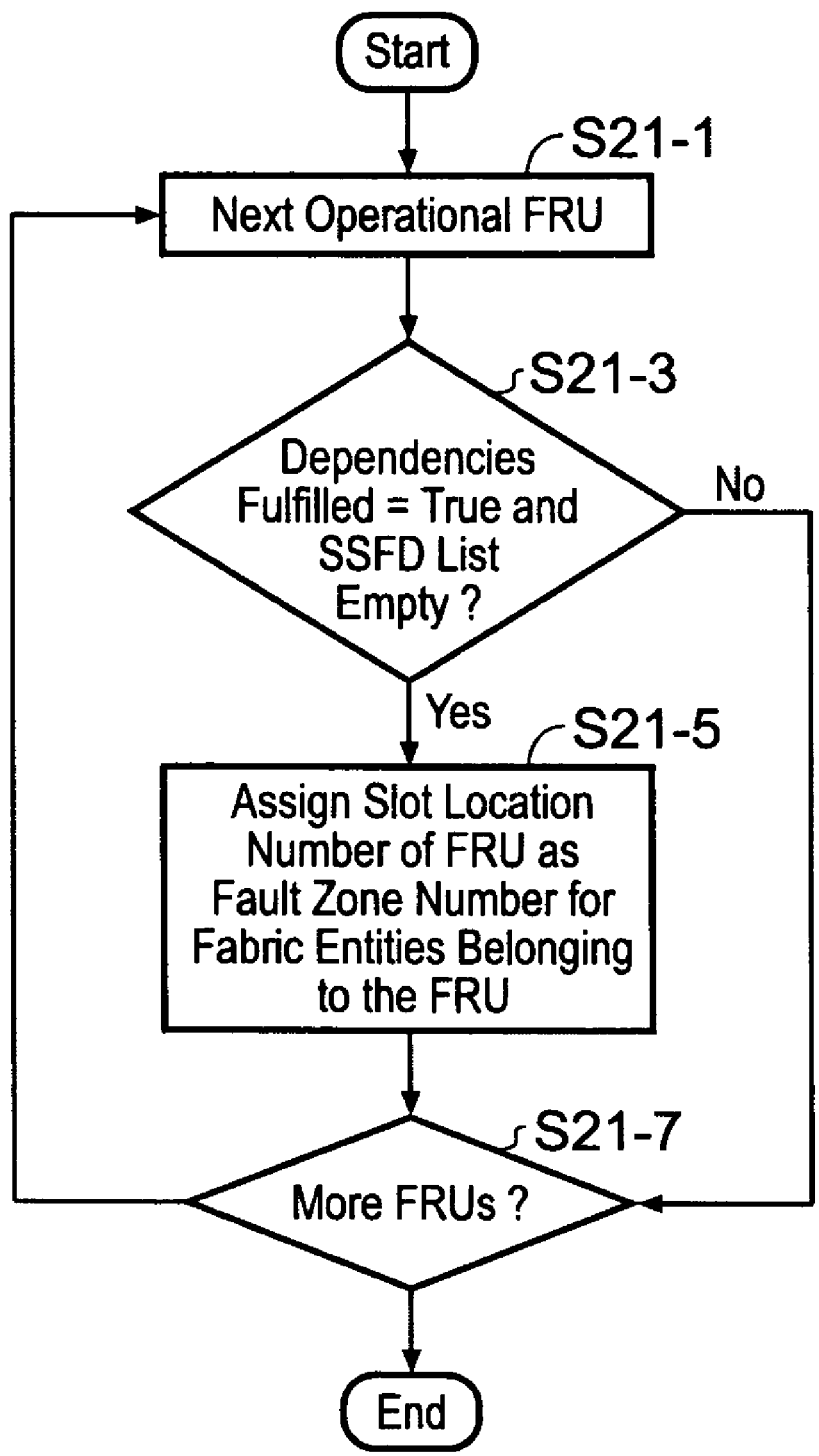
FIG. 21 is a flow diagram showing the operation of a first part of a fault zone number assignment function.

Referring first to FIG. 21, the function starts at step S21-1 where a next operational FRU is selected. Then, at step S21-3 the records describing the FRU are analysed to determine whether the DependenciesFulfilled variable for that FRU is true and whether the SSFD list for the FRU is empty. If both of these conditions are satisfied, then at step S21-5 the Slot Location Number for the FRU is assigned as the Fault Zone Number for fabric entities belonging to that FRU. Following that assignment, or if the conditions tested at step S21-3 are not satisfied, then a check is performed at step S21-7 to determine whether any more operational FRUs are present. If so, processing returns to step S21-1 and a next operation FRU is selected. Otherwise the first part of the function ends. This first art of the function therefore identifies FRUs which have no dependencies on other single (i.e. non-redundant FRUs). Such FRUs can be considered as a self-contained fault zone.

Figure 22:
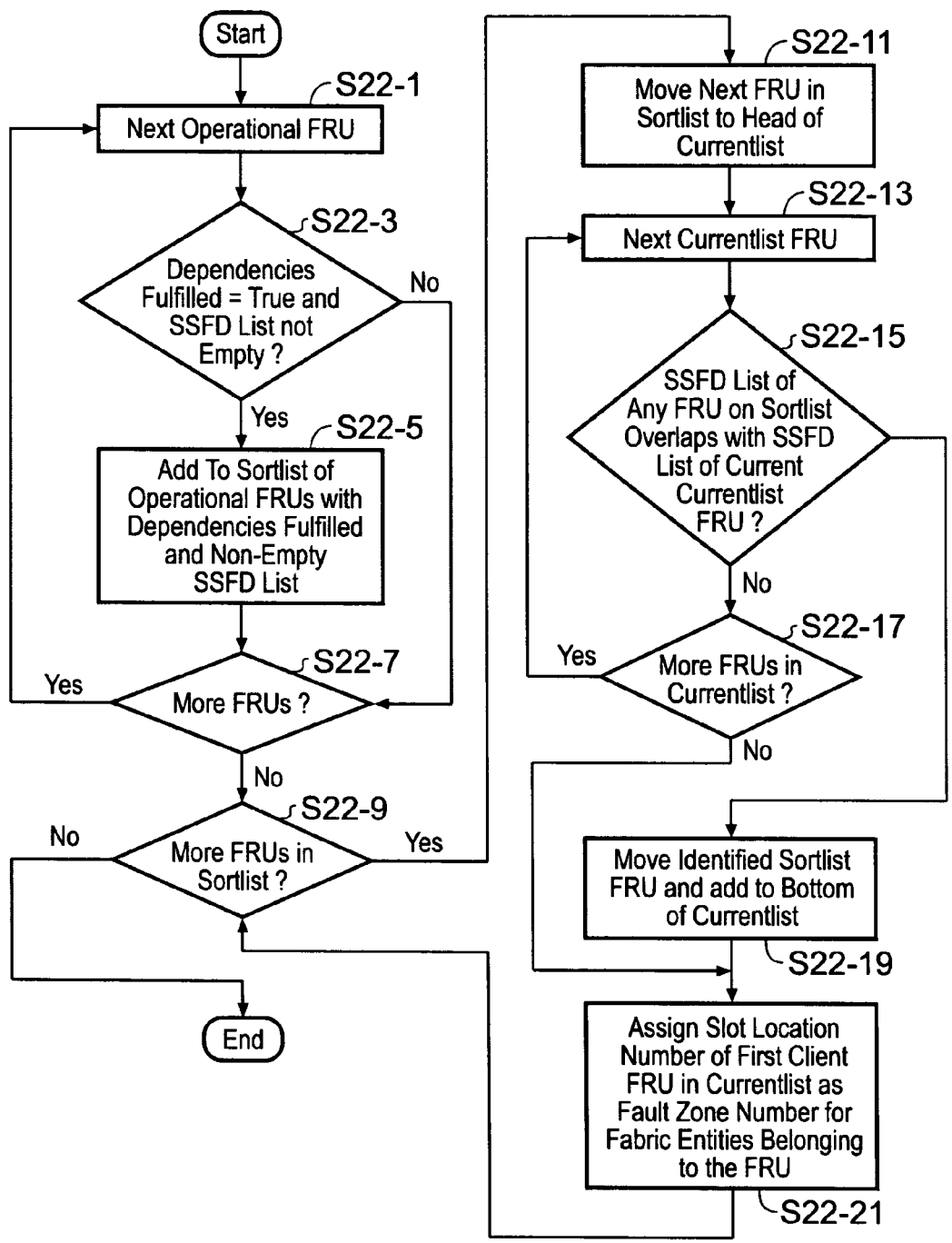
FIG. 22 is a flow diagram showing the operation of a second part of a fault zone number assignment function.

Referring now to FIG. 22, the second part of the function starts at step S22-1, where a next operational FRU is selected. For this second part of the function, any FRUs designated as self-contained fault zones in the first part of the function can be ignored, as they already have a fault zone number assigned. The records for the selected current FRU are then analysed at step S22-3 to determine whether the DependenciesFulfilled variable for that FRU is true and whether the SSFD list for the FRU is not empty. If both of these conditions are satisfied, then at step S22-5 the current FRU is added to a sorted list of operational FRUs with those conditions satisfied. Next, or if the conditions are determined not to be met at step S22-3, a check is performed (at step S22-7) to determine whether any more operational FRUs are present. If so, processing returns to step S22-1 and a next FRU is selected. Alternatively, if no more FRUs are present, then all of the operational FRUs have been considered and all FRUs having DependenciesFulfilled=True and a non-empty SSFD list have been added to the sorted list.

Next, at step S22-9, a check is performed to determine whether any FRUs remain in the sorted list. If so, processing continues at step S22-11 where the next FRU in the sorted list is moved to the head of a further list, CurrentList. At step S22-13 a next CurrentList FRU is selected. The records corresponding to all of the FRUs on the sorted list are then analysed at Step S22-15 to determine whether the SSFD list of any of those FRUs overlaps with the SSFD list of the CurrentList FRU. If no overlap is discovered, then a check is performed at step S22-17 to determine whether any more FRUs are present on CurrentList. If more FRUs are present, then processing returns to step S22-13 and a next CurrentList FRU is selected.

On the other hand, if at step S22-15 it is determined that an overlap in SSFD lists occurs, then processing continues at step S22-19 where the FRU on the sorted list having a SSFD list overlap with the SSFD list of the selected CurrentList FRU is moved from the sorted list and added to the bottom of CurrentList. Once step S22-19 has completed, or if it is determined at step S22-17 that no more FRUs are present in CurrentList, processing moves to step S22-21. At this step the slot location number of the first client FRU in CurrentList is assigned as the Fault Zone Number for all of the fabric entities which belong to that FRU.

Processing now returns to step S22-9 where the check as to whether any more FRUs remain in the sorted list. If yes, processing again goes to step S22-11 where a new CurrentList is started. Otherwise the function ends.

The above-described process can also be expressed by means of the following pseudo-code.

```
BEGIN (Fault zone number assignment function);
FOR each operational client FRU with DependenciesFulfilled and with
empty Single Service FRU dependency list)
   {Since the FRU does not currently have any dependency on any other
   single (i.e. non-redundant) FRU instances, the FRU itself is to be
   considered a single fault zone}
   Assign the slot location number of the FRU as fault zone number for
   the fabric entities that belongs to this FRU;
ENDFOR
Create a sorted list (SortList) of the remaining operational client FRUs
```

-continued

```
with dependencies Fulfilled based on the number of member FRUs
in the corresponding single service FRU dependency list;
   {SortList is sorted in decreasing order so that the client FRU with the
   largest number of FRUs in it's single service FRU dependency list
   becomes the head of the resulting list}
WHILE (SortList is not empty):
   Remove the head of SortList and keep it as head of CurrentList;
   FOR (each remaining FRU in SortList):
      overlap = FALSE;
      CurrentFru = head of CurrentList;
      more = TRUE;
      WHILE (NOT overlap AND more):
         IF(the single service FRU dependency list of the current
            SortList FRU has any member that is also a member
            of the single service FRU dependency list of
            CurrentFru)
               {There has been detected a shared dependency
               between two client FRUs.}
               Remove current SortList FRU from SortList and
               add it to the tail of CurrentList;
               overlap = TRUE;
         ELSE IF (CurrentFru is NOT last FRU in CurrentList):
               CurrentFru = next FRU in CurrentList;
         ELSE
               More = FALSE;
         ENDIF
      ENDWHILE
   ENDFOR
   {CurrentList now represents a set of (one or more) client FRUs that
   have dependency on at least one non-redundant service FRU.
   If the CurrentList contains more than a single client FRU, then each
   such client FRU shares dependency on (at least) a single service FRU
   with (at least) one other client FRU.
   It is also the case that no shared single FRU dependency exists between
   any client FRU in CurrentList and any other client FRU within the
   chassis that is not on CurrentList.
   See additional discussion of possible dependency relationships in the
   footnote (*) below.}
   FOR (all client FRUs in CurrentList):
      Assign the FRU location number of the first client FRU in
      CurrentList as fault zone number for the fabric entities that
      belongs to this FRU;
   ENDFOR
ENDWHILE
END (Fault zone number assignment function)
```

(*) Footnotes to fault zone number assignment function:

In the general case, it is possible that client FRUs A and B share dependency on service FRU X whereas client FRUs B and C share dependency on service FRU Y, but without any shared dependency on a single service FRU between client FRUs A and C.

These kinds of dependency relationships can only be accurately represented by the use of more than a single internal fault zone number for each fabric entity. Hence, in order to express dependency relationships with only a single internal fault zone number per fabric entity, the fabric entities of FRUs A, B and C will all have to share an internal fault zone number as ensured by the function set out above. In many applications for a fault tolerant computer system such as that provided by the present example, indicating no current dependency between two dependent entities is, in general, a more severe problem than indicating a "false" dependency between two entities that are currently independent. This is because falsely indicating a dependency might result in sub-optimal use of resources but will ensure the desired level of fault tolerance, whereas falsely not indicating a dependency may reduce the actual fault tolerance of the system below the desired level.

If chassis designs have (as in the present example) redundant (dual) service FRUs shared by all client FRUs, or groups of client FRUs sharing a set of redundant service FRUs with no overlap between such groups (or only real subset relationships between such groups), there will typically not be any such "chains" of indirect dependency relationships between client FRUs. Hence, the problem with such "false" dependencies is not particularly relevant to the present example. However, in other examples, other hardware arrangements can be used and in order to address this issue for such arrangements, an implementation of the fault zone number assignment function can have the following enhancements to the basic scheme outlined above:

Define a variable-sized array of internal fault zone numbers for each fabric entity.
  Define current number of internal fault zone numbers as well as individual numbers. (The number of fault zone numbers will depend on the number of single service FRU instances as outlined below.)
  The Fabric Manager should then define its dependency relation check as finding at least one common number in two variable sized sets of numbers (i.e. instead of just matching single numbers for entities that belong to the same chassis).
  The Box Manager might implement the fault-zone definition mechanism as a one-to-one relationship between single service FRU instance and internal fault zone number, and create a list of internal fault zone numbers for each fabric entity that would represent the FRU that the entity belongs to, as well as all service FRUs that currently is included in the corresponding single service FRU dependency list.

Examples of support functions which the fault zone definition mechanism can provide will now be described with reference to FIGS. 23 to 26 and using the same pseudo-code format as the functions described above.

Check for Externally Visible Status Change

This function checks for externally visible status changes with respect to the FRUs in a chassis.

Figure 23:
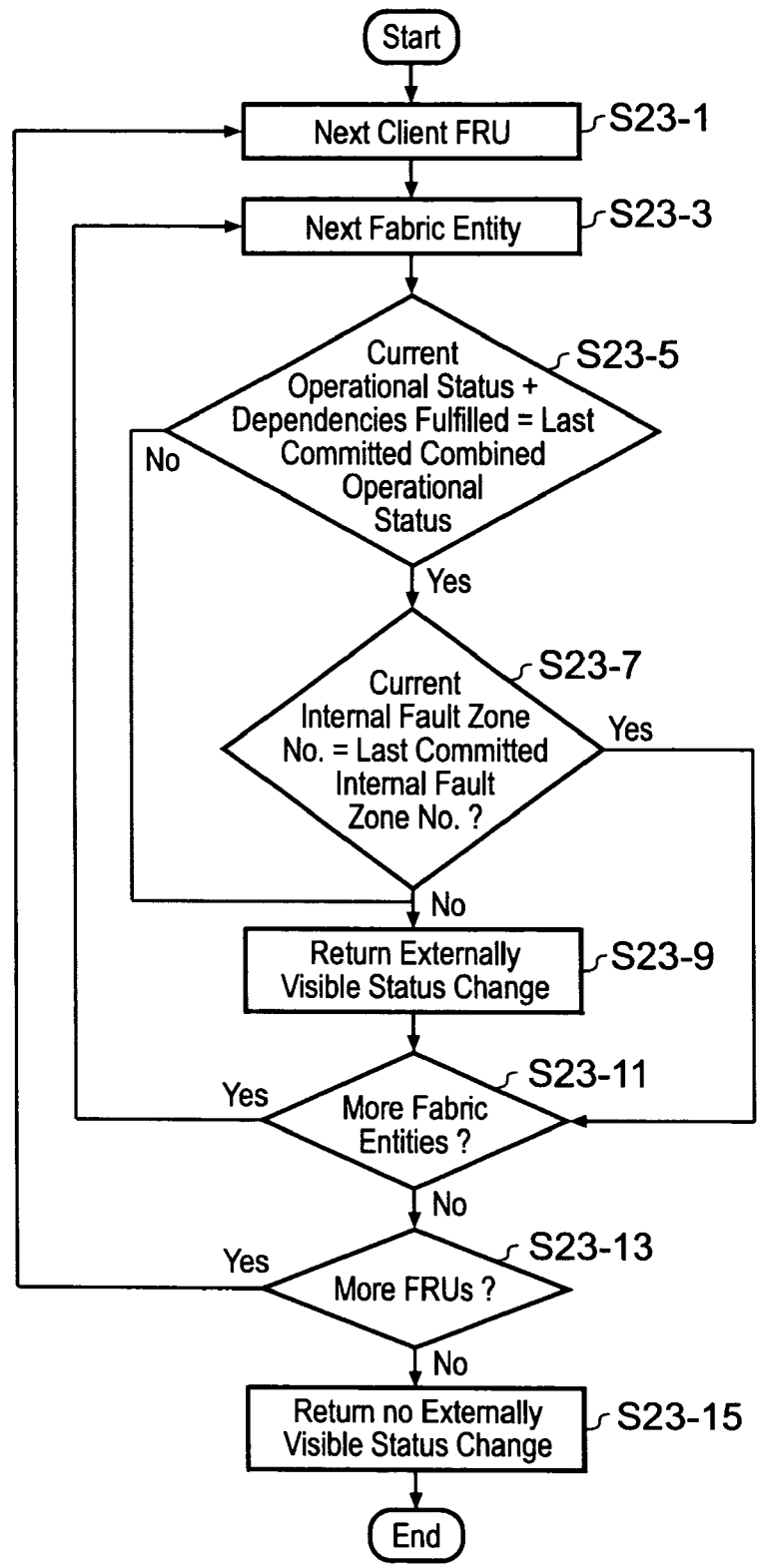
FIG. 23 is a flow diagram showing the operation of a check for externally visible status changes function.

As shown in FIG. 23, the function starts at step S23-1 by selecting a next client FRU. Then at step S23-3, a next fabric entity for the selected FRU is selected. For the selected fabric entity, the Current Operational Status and Dependencies Fulfilled variables are logically ANDed and the result compared to the Last Committed Combined Operational Status value at step S23-5 (note that the Current Operational Status is initially set to Not Operational when the corresponding FRU is newly added to the system). If the result of the AND operation is different to the Last Committed Combined Operational Status Value, processing continues at step S23-9 where an externally visible status change is returned. On the other hand, if the result of the AND operation and the Last Committed Combined Operational Status value are the same, the Current internal Fault Zone Number and Last Committed Internal Fault Zone Number are compared at step S23-7. If these values are different, then an externally visible status change is returned at step S23-9. Otherwise, if either the Current and Last Committed Internal Fault Zone Numbers are the same, or if an externally visible status change has been returned, processing continues at step S23-11 where a check is performed to determine whether any more fabric entities belong to the current FRU. If so, processing returns to step S23-3 where a next fabric entity is selected. On the other hand, if no more fabric entities are present, processing continues at step S23-13 where a check is performed to determine whether any more FRUs are present. If so, processing returns to step S23-1 and a next FRU is selected. Otherwise the function ends by returning a no externally visible status change at step S23-15 (i.e. negative result).

The above-described process can also be expressed by means of the following pseudo-code.

BEGIN (Check for externally visible status change)
FOR (all client FRUs):
 FOR (all fabric entities on the FRU):
  {The initial value for "Current Operational status" is "NotOK" when the corresponding FRU has just been added to the system}
  IF (The logical ANDing of "Current Operational status" for the entity and the FRU as well as "Dependencies Fulfilled" for the FRU is different from the value of "Last committed combined operational status" for the entity OR "Current Internal fault zone number" is not the same value as "Last committed internal fault zone number" for the entity):
   RETURN (there is an externally visible status change);
  ENDIF
 ENDFOR
ENDFOR
RETURN (there is no externally visible status change);
END (Check for externally visible status change)

Commit Externally Visible Status Change

This function commits any externally visible status changes with respect to the FRUs in a chassis to the recorded values such that the changes are recorded as the starting point for any future externally visible status change checks.

Figure 24:
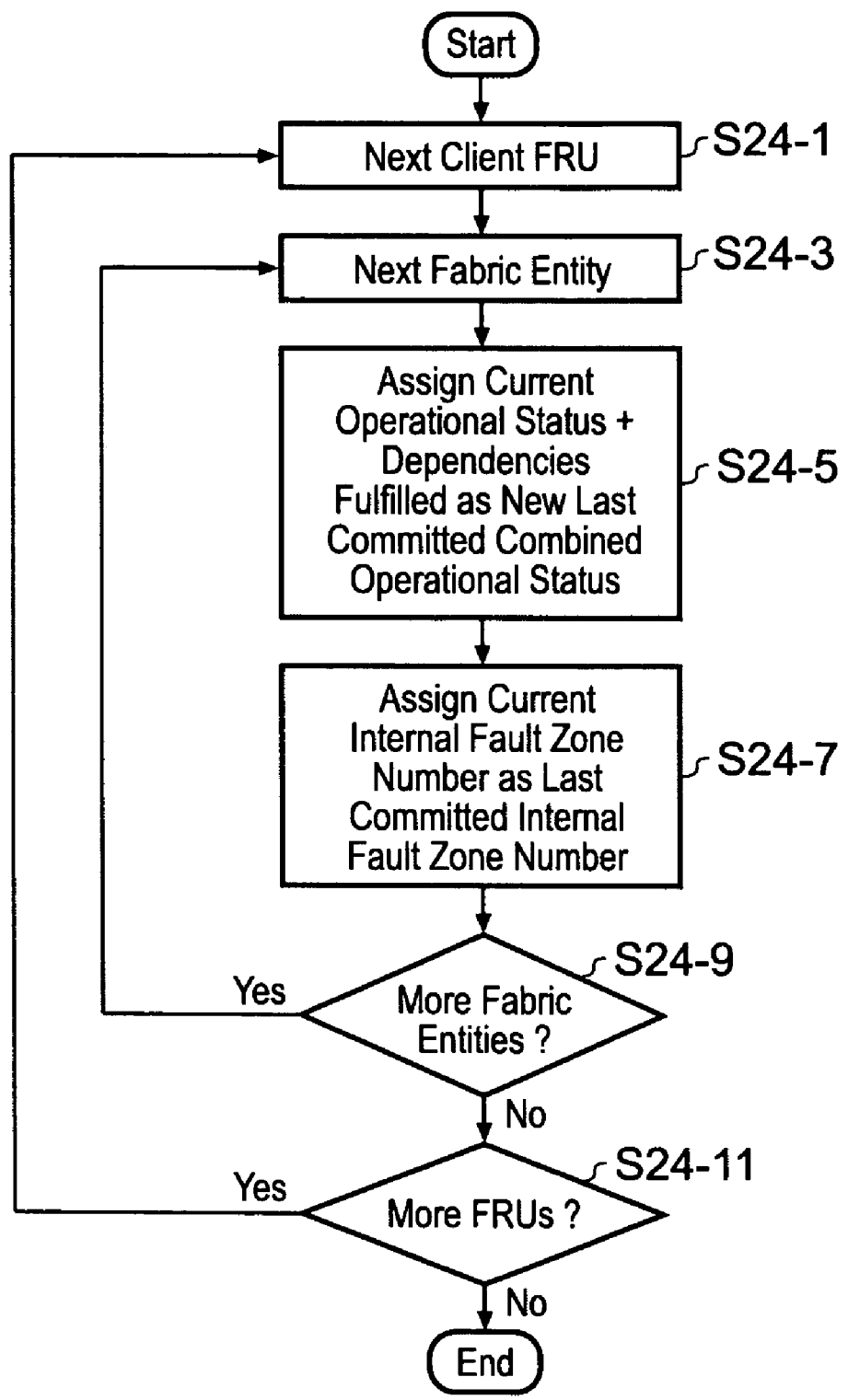
FIG. 24 is a flow diagram showing the operation of a commit externally visible status changes function.

As shown in FIG. 24, the function starts at step S24-1 where a next client FRU is selected. Then, at step S24-3, a next fabric entity belonging to that FRU is selected. For the selected fabric entity the result of logically ANDing the Current Operational Status and the Dependencies Fulfilled variables is assigned as the Last Committed Combined Operational Status at step S24-5. Then, at step S24-7, the Current Internal Fault Zone Number is assigned as the Last Committed Internal Fault Zone Number. Thus the new values are set as the values corresponding to the current status of the entity. At step S24-9 a check is performed to determine whether any more fabric entities belong to the current FRU. If so, processing returns to step S24-3 where a next fabric entity is selected. On the other hand, if no more fabric entities are present, processing continues at step S24-11 where a check is performed to determine whether any more FRUs are present. If so, processing returns to step S24-1 and a next FRU is selected. Other wise the function ends.

The above-described process can also be expressed by means of the following pseudo-code.

BEGIN (Commit externally visible status change):
FOR (all client FRUs):
 FOR (all fabric entities on the FRU):
  Assign the logical ANDing of "Current Operational status" for the entity and the FRU as well as "Dependencies Fulfilled" for the FRU as the new value for "Last committed combined operational status" for the entity;
  Assign the value of "Current Internal fault zone number" as the new value for "Last committed internal fault zone number" for the entity;
 ENDFOR
ENDFOR
END (Commit externally visible status change)

Notify Externally Visible Status Change

This function notifies any externally visible status changes with respect to the FRUs in a chassis to the recorded values such that an external management entity is made aware of the changes.

Figure 25:
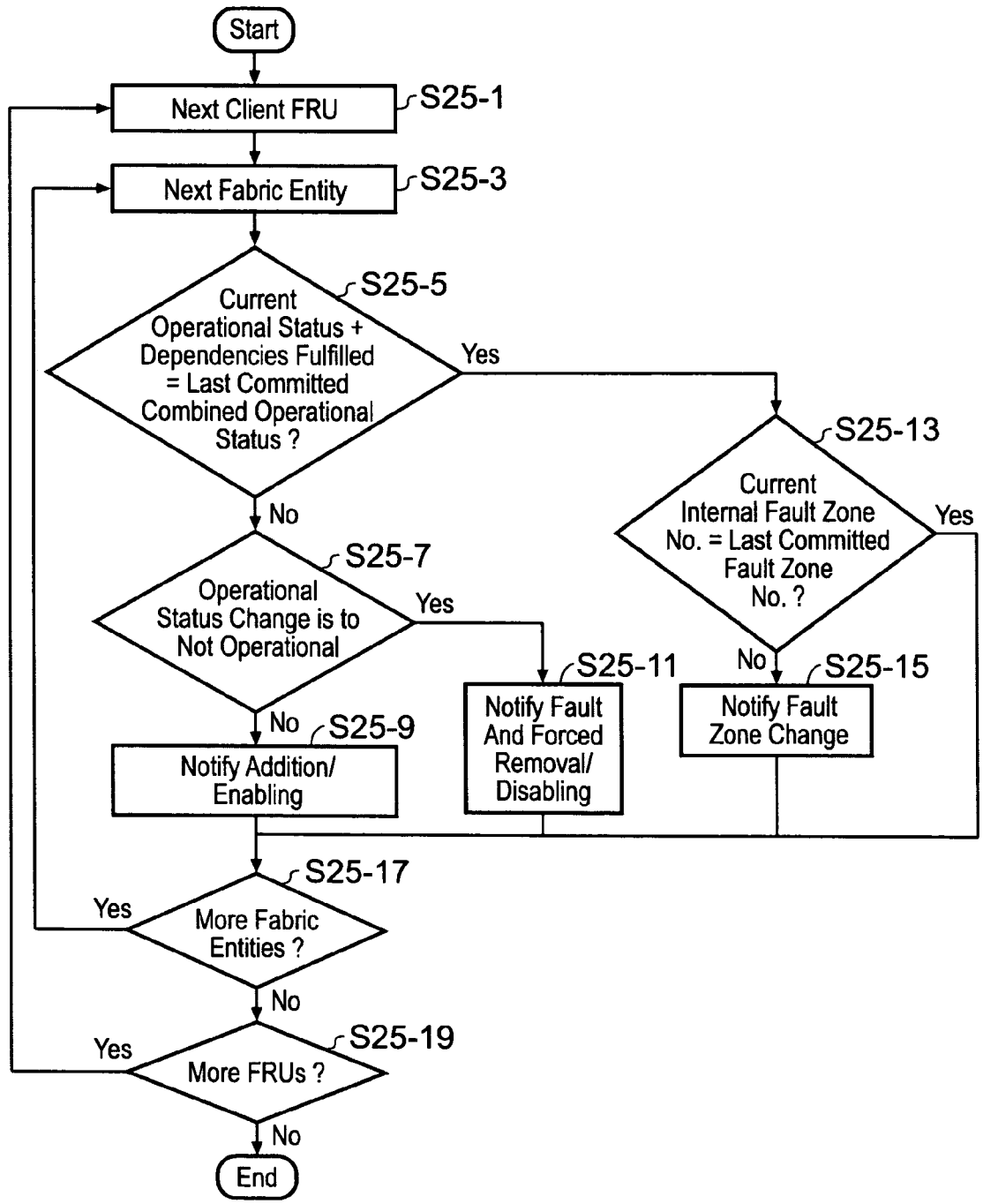
FIG. 25 is a flow diagram showing the operation of a notify externally visible status changes function.

As shown in FIG. 25, the function starts at step S25-1 where a next client FRU is selected. Then, at step S25-3, a next fabric entity belonging to that FRU is selected. For the selected fabric entity, the Current Operational Status and Dependencies Fulfilled variables are logically ANDed and the result compared to the Last Committed Combined Operational Status value at step S25-5. If the result of the AND operation is different to the Last Committed Combined Operational Status Value, processing continues at step S25-7 where a check is performed to determine whether a change in Operational Status from Operational to Not Operational has occurred. If such a change has occurred, processing continues at step S25-11 where a fault is notified along with any forced removals or disablings which may be necessary as a result of the fault. Otherwise, if the Operational Status has not changed from Operational to Not Operational, (i.e. the change is from Not Operational to Operational) processing continues at step S25-9 where the new availability of the FRU is notified. On the other hand, if it is determined at step S25-5 that the result of the AND operation is the same as the Last Committed Combined Operational Status, then processing continues at Step S25-13 where a check is performed to determine whether the Current And Last Committed Internal fault Zone Numbers are the same. If not, processing continues at step S25-15 where the fault zone change is notified. Otherwise, or when processing at any of steps S25-9, S25-11, S25-15 has completed, the function continues at step S25-17 where a check is performed to determine whether any more fabric entities belong to the current FRU. If so, processing returns to step S25-3 where a next fabric entity is selected. On the other hand, if no more fabric entities are present, processing continues at step S25-19 where a check is performed to determine whether any more FRUs are present. If so, processing returns to step S25-1 and a next FRU is selected. Otherwise the function ends.

The above-described process can also be expressed by means of the following pseudo-code.

```
BEGIN (Notify externally visible status change):
    FOR (all client FRUs):
        FOR (all fabric entities on the FRU):
            IF (The logical ANDing of "Current Operational status"
                for the entity and the FRU as well as "Dependencies
                Fulfilled" for the FRU is different from the value of
                "Last committed combined operational status" for
                the entity):
                IF (The change is from operational to not
                    operational):
                    Send notification(s) about forced
                    removal/disable or fault;
                ELSE: {i.e. from not operational to operational}
                    Send notification(s) about adding/
                    enabling;
                ENDIF
            ELSE IF ("Current Internal fault zone number" is not the
                same value as "Last committed internal fault zone
                number" for the entity):
                Send notification(s) about fault zone change;
            ELSE: {i.e. no change}
                do nothing;
            ENDIF
        ENDFOR
    ENDFOR
END (Notify externally visible status change)
```

Request Externally Visible Status Change

This function requests information about any externally visible status changes with respect to the FRUs in a chassis to the recorded values. This function is typically used to check for externally visible status changes when a service request is made.

Figure 26:
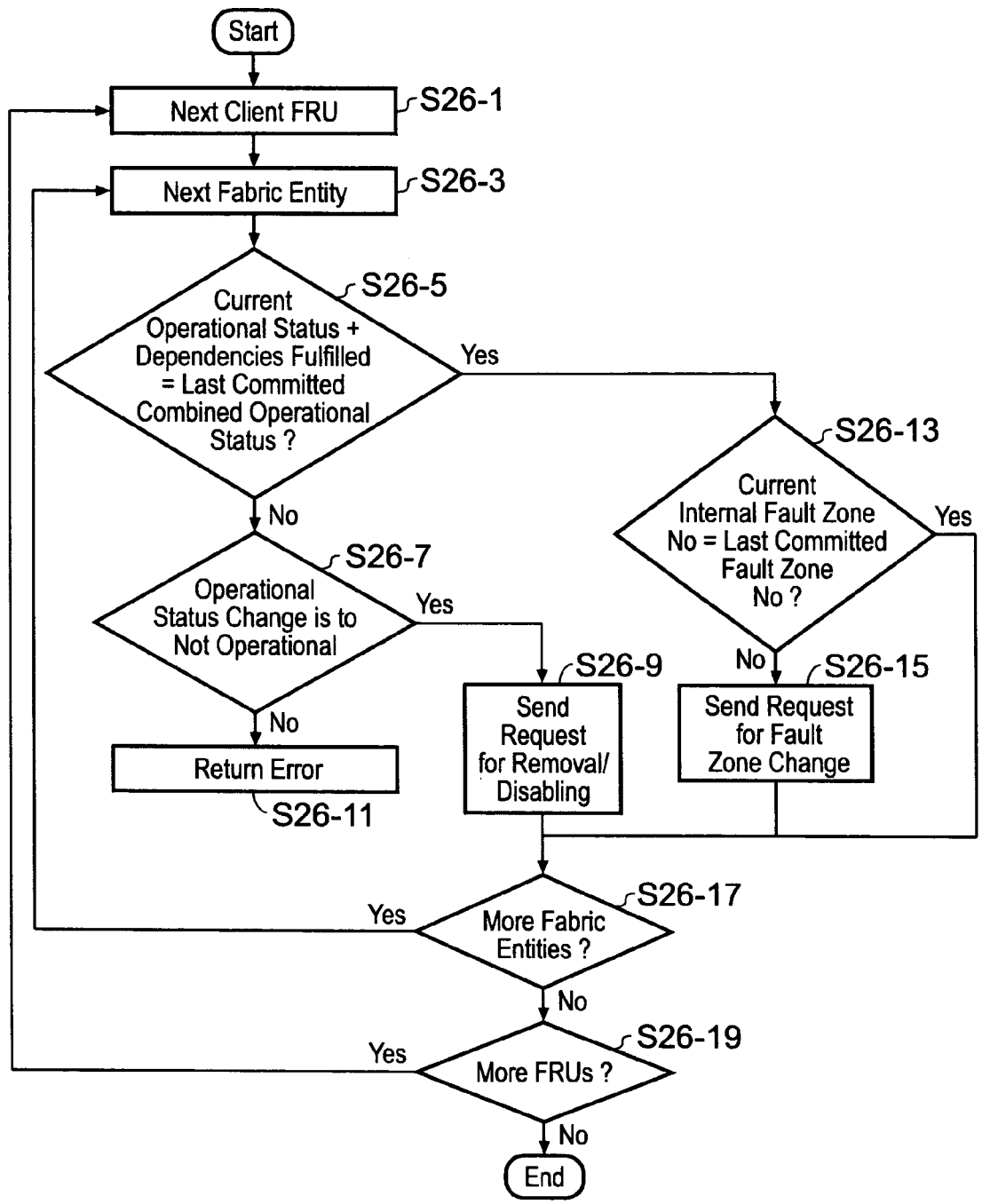
FIG. 26 is a flow diagram showing the operation of a request externally visible status changes function.

As shown in FIG. 26, the function starts at step S26-1 where a next client FRU is selected. Then, at step S26-3, a next fabric entity belonging to that FRU is selected. For the selected fabric entity, the Current Operational Status and Dependencies Fulfilled variables are logically ANDed and the result compared to the Last Committed Combined Operational Status value at step S26-5. If the result of the AND operation is different to the Last Committed Combined Operational Status Value, processing continues at step S26-7 where a check is performed to determine whether a change in Operational Status from Operational to Not Operational has occurred. If such a change has occurred, processing continues at step S26-9 where a request for removal and/or disabling of the failed FRU is sent to the requesting entity. Otherwise, if the Operational Status has not changed from Operational to Not Operational, (i.e. the change is from Not Operational to Operational) processing continues at step S26-11 where an error status is returned before the function is ended. The reason for returning an error status is that an external requester should never be requesting access to a FRU whose availability has not yet been publicized through the Last Committed Combined Operational Status variable. On the other hand, if it is determined at step S26-5 that the result of the AND operation is the same as the Last Committed Combined Operational Status, then processing continues at Step S26-13 where a check is performed to determine whether the Current And Last Committed Internal fault Zone Numbers are the same. If not, processing continues at step S26-15 where a request for a fault zone change is sent. Otherwise, or when processing at either of steps S26-9 or S26-15 has completed, the function continues at step S26-17 where a check is performed to determine whether any more fabric entities belong to the current FRU. If so, processing returns to step S26-3 where a next fabric entity is selected. On the other hand, if no more fabric entities are present, processing continues at step S26-19 where a check is performed to determine whether any more FRUs are present. If so, processing returns to step S26-1 and a next FRU is selected. Otherwise the function ends.

The above-described process can also be expressed by means of the following pseudo-code.

```
BEGIN (Request externally visible status change):
    FOR (all client FRUs):
        FOR (all fabric entities on the FRU):
            IF (The logical ANDing of "Current Operational status"
                for entity and the FRU as well as "Dependencies
                Fulfilled" for the FRU is different from the value of
                "Last committed combined operational status" for
                the entity):
                IF (The change is from operational to not
                    operational):
                    Send request(s) about removal/disable;
                ELSE: {i.e. from not operational to operational}
                    Return error;
                    {This situation should never happen for a
                    requested operation}
                ENDIF
            ELSE IF ("Current Internal fault zone number" is not the
                same value as "Last committed internal fault
                zone number" for the entity):
                Send request(s) about fault zone change;
            ELSE: {i.e. no change}
                do nothing;
            ENDIF
        ENDFOR
    ENDFOR
END (Request externally visible status change)
```

Communication Protocol Example

An example of a suitable protocol for communication between the Fabric Manager and Box Manager in an InfiniBand™ environment will now be described.

The InfiniBand™ specification defines the General Services interface as different classes of functionality that each have a specific set of Management Datagrams (MADs) with methods and attributes that are specific for the class. The MADs are used for communication between one or more class specific Manager instances located behind one or more port(s) in the InfiniBand™ fabric and the various class specific agent instances that each are associated with a specific InfiniBand™ port.

Among these classes is the Baseboard Management (BMA) class that is used to retrieve information about properties and state relative to the physical implementation of the various InfiniBand™ ports/nodes and the enclosure/chassis they are contained in.

The fault zone information is conceptually very much related to the BMA class, but since the InfiniBand™ specification does not deal with fault zone information, there are no standard methods and attributes that can be used to convey this information. However, the BMA class supports send methods with a special "OEM Command" attribute. The OEM Command type allows a globally unique vendor number as well as vendor specific protocol number to be identified. In this way a proprietary protocol may be implemented using standard messaging primitives. A manager instance that would like to make use of such a proprietary protocol can determine if an agent instance supports this particular protocol version in a standard (InfiniBand™ specification defined) way. The protocol itself does not depend on being implemented on top of a MAD based IB communication, but could also be implemented using (e.g.) TCP or UDP over IP on any media as the underlying communication mechanism.

Message Types:

There are various types of messages which can be used within the communication protocol of the present example. Some examples of message types which could be used are defined below. In the following description FM denotes "Fabric Manager" and BM denotes "Box Manager". Each message type has an associated sender and receiver ("sender"->"receiver") specified. If more than a single sender/receiver combination is possible (e.g. for acknowledgements "ACKs"), then all relevant combinations are listed as individual message types.

Queries FM->BM
Specifies a fabric entity and a desired set of information.
Replies BM->FM
Provides the set of information specified in the corresponding query (if successful) and related status.
Requests BM->FM
Specifies an event number, a fabric entity and a change type.
Responses FM->BM
Specifies accept or reject for the change defined by the corresponding request (i.e. related to a specific event number and fabric entity).
Notifications BM->FM
Specifies an event number, a fabric entity and a status or change type.
ACKs BM->FM
Notifies that a message (query or response) has been successfully received.
ACKs FM->BM
Notifies that a message (reply, request or notification) has been successfully received.
NACKs BM->FM
Notifies that a message (query or response) was not allowed in the current state, and/or that the state that the message was based on has changed.

Event Information and Change Classes

In the present example, a change in state in a chassis can be described as an event and can be handled by a "change" class of methods.

In the present example, all events represent some change of state within the chassis. Events can be identified by a major event number as well as a minor event number. A basic event (major event number) represents a change of physical state within the chassis, whereas the effect that this change of physical state has on individual fabric entities within the chassis may reflected by one or more sub-events that can each be identified by the major event number associated with the corresponding basic event, as well as a specific minor event number.

In the present example, each major event number is unique throughout the lifetime of the chassis (i.e. also across rebooting and power cycling of the complete chassis). The minor event numbers are unique within the scope of a single sub-event, hence an event number (major and minor) uniquely identifies a particular state change for a particular fabric entity within the chassis. In order to allow representation of just the basic events with the same format as other events, the minor event number zero is reserved for representing the basis event itself. The combination of unique chassis ID and event number is therefore universally unique in time and space, and can denote any basic event or sub event.

In some examples, the value ranges of major and minor event numbers are negotiated as part of setting up a session between a fabric/resource manager and a box manager. In other examples, the values can be constants defined by the protocol specification (i.e. "fixed wire protocol properties"). Examples of suitable values might include 32 and 16 bit values.

Class Examples

Addition Based Change

Insertion or enabling of a FRU or a set of FRUs or one or more isolated fabric entities may cause fabric entities to become available (again), and/or may change the fault zone status of existing entities to a status of less dependency than that indicated by the current state (i.e. no negative impact).

Requested Removal Based Change:

Removal or disabling of a FRU or a set of FRUs or one of more isolated fabric entities may cause existing fabric entities to become unavailable, and/or may change the fault zone status or existing entities to a status of higher dependency than that indicated by the current state (i.e. potential negative impact). Such events are handled as request(s) from the box manager to the fabric manager(s) in order to allow the fabric manager(s) to determine the extent by which the indicated change(s) can be mitigated and then accept or reject the change(s) in subsequent response message(s) (i.e. within a timeout period defined by the protocol).

Forced Removal Based Change:

Same as requested removal, but without any handshaking of acceptance or rejection of the indicated change(s).

Fault Based Change:

Faults may cause a FRU or a set of FRUs or one or more isolated fabric entities to become not operational and/or may change the fault zone status or existing entities to a status of higher dependency than that indicated by the current state (i.e. potential negative impact).

Event Sequencing and Reporting

A single basic event may relate to a set of different FRUs and or fabric entities. For example, a requested remove operation may be initiated for a set of FRUs via an administrator interface of the Box Manager. In this case all the sub-operations are considered part of the same basic event. However, if the same set of operations is initiated as a sequence of independent operations, then each operation will correspond to a separate basic event.

As described above, each basic event is assigned a unique major event number. All messages from the Box Manager include the current major event number. On the other hand, all messages from the Fabric Manager to the Box Manager include the expected current major event number. If the expected current event number is no longer the current major event number then the related state may have changed and the message may be "NACKed" (see message example above).

It is possible for a Fabric Manager to synchronise with the current state of all entities handled by a Box Manager instance as the query interface allows all state information to be retrieved independently of explicit event reporting, and the current event number scheme allowed the Fabric Manager to determine when (if) the state of the Box Manager has stabilised in terms of no more change related events occurring for a given basic event.

Also, for maximum reliability, the Fabric Manager should ensure that all implications of a requested change are observed before it accepts any specific change for a single entity.

Addition:

Addition based change events are sequenced and the handling is atomic relative to any other events in the sense that the total state change that results from any such event is evaluated and a unique basic event number is allocated for this event before any change is made visible for queries or is actively reported. Atomic handling implies that no other handling event takes place concurrently with the handling specified as atomic.

Other additions or requested removal events will be handled in order (unique event numbers) relative to this addition, and reporting of such other events will not commence before reporting of this addition has completed. Forced removals and InfiniBand™ fault events will also be ordered in terms of unique event numbers, but such events may abort further handling of the presently handled addition (reporting) since the state in existence as a result of the addition have become stale as a result of the forced removal/Infiniband™ fault event.

In the present example, reporting is implemented as notifications from the box manager to the fabric manager. Each fabric entity that becomes available will be reported separately and any update in fault zone status will also be reported on a per fabric entity basis.

Requested Removal:

Requested removal based change events are ordered and the handling is atomic relative to any other events unless the handling is aborted. Hence, no additions or other requested removals will be handled as long as reporting and handshaking for the current event is in progress.

In the present example, reporting and handshaking is implemented as requests from the box manager to the fabric manager(s), and with responses (accept or reject) from the fabric manager(s) to the box manager. A fault or a forced change that takes place before all related handshaking has completed may abort the requested removal handling in that no further requests for the ongoing requested removal are initiated, and any subsequently incoming responses may therefore be "NACKed".

Each fabric entity that may become unavailable will be reported separately and any update in fault zone status will also be reported on a per fabric entity basis.

Since handling of requested removal is not complete until all relevant responses have been received (i.e. potentially from multiple Fabric Manager instances associated with different fabric configurations that are all connected to the relevant chassis via different fabric ports), the notification of the present example includes information about the outcome of the requested change. The possible outcomes are:

accepted by all relevant Fabric Manager instances
rejected by at least one Fabric Manager instance
aborted by the Box Manager (i.e. due to the occurrence of a fault within the chassis during the handshake phase, or because the handshake phase timed-out and/or abort was initiated based on some kind of admin input).

Forced Removal:

Handling of forced removal based change events corresponds to the handling of requested removal except that no accept/reject handshaking with the Fabric Manager is involved. Also, handling of forced removal will abort any uncompleted handling of prior events.

In the present example, reporting is implemented as notifications from the box manager to the fabric manager. Each fabric entity that becomes unavailable will be reported separately and any update in fault zone status will also be reported on a per fabric entity basis.

Faults:

Handling of fault based change events corresponds to the handling of forced removal except that the associated status is different.

In the present example, reporting is implemented as notifications from the box manager to the fabric manager. Each fabric entity that becomes unavailable with be reported separately and any update in fault zone status will also be reported on a per fabric entity basis.

Internal Box Manager Handling of Change Events

In the following descriptions, it is assumed that the Box Manager gets the information that represents the basic event in a way that depends on the type of event as well as on how the corresponding chassis and system platform is implemented.

The platform specific implementation aspects have to do with the observation and handling of the state of the relevant hardware components as well as the handling of administrative/management input.

In particular, this means that the implied physical state changes and affected FRUs and or fabric entities are considered implicit input to the various functions. Also, the fact that FRU information instances will be allocated and released as part of physical insertion and removal operations are not considered here.

Requested Change Handling Function

Since requested changes involve a handshaking phase, that may or may not result in the requested change becoming committed, it is in the present example required that any implied changes are handled in a way that allows for "rollback" without any change to the original state. Also, this implies that the handling includes a request phase as well as a later notification phase so that the outcome of the requested change handshaking can be observed by all relevant Fabric Manager instances when it has been determined.

An additional issue is that the transient state (that may or may not become committed) should be observable during the handshaking phase (i.e. in addition to the current official state).

Figure 27A:
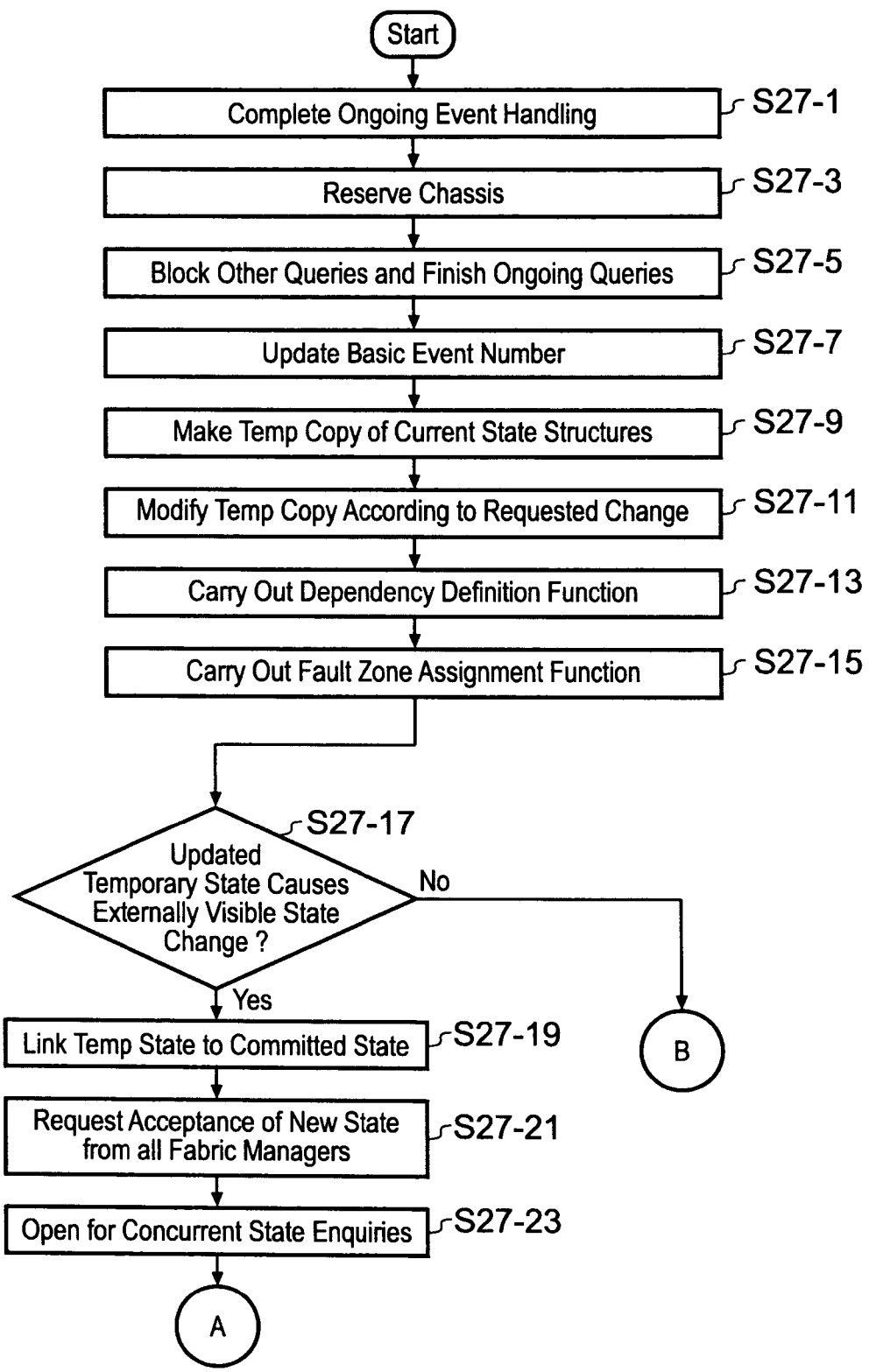
FIG. 27 is made up of FIGS. 27A and 27B and is a flow diagram showing the operation of a requested change handling function.
Figure 27B:
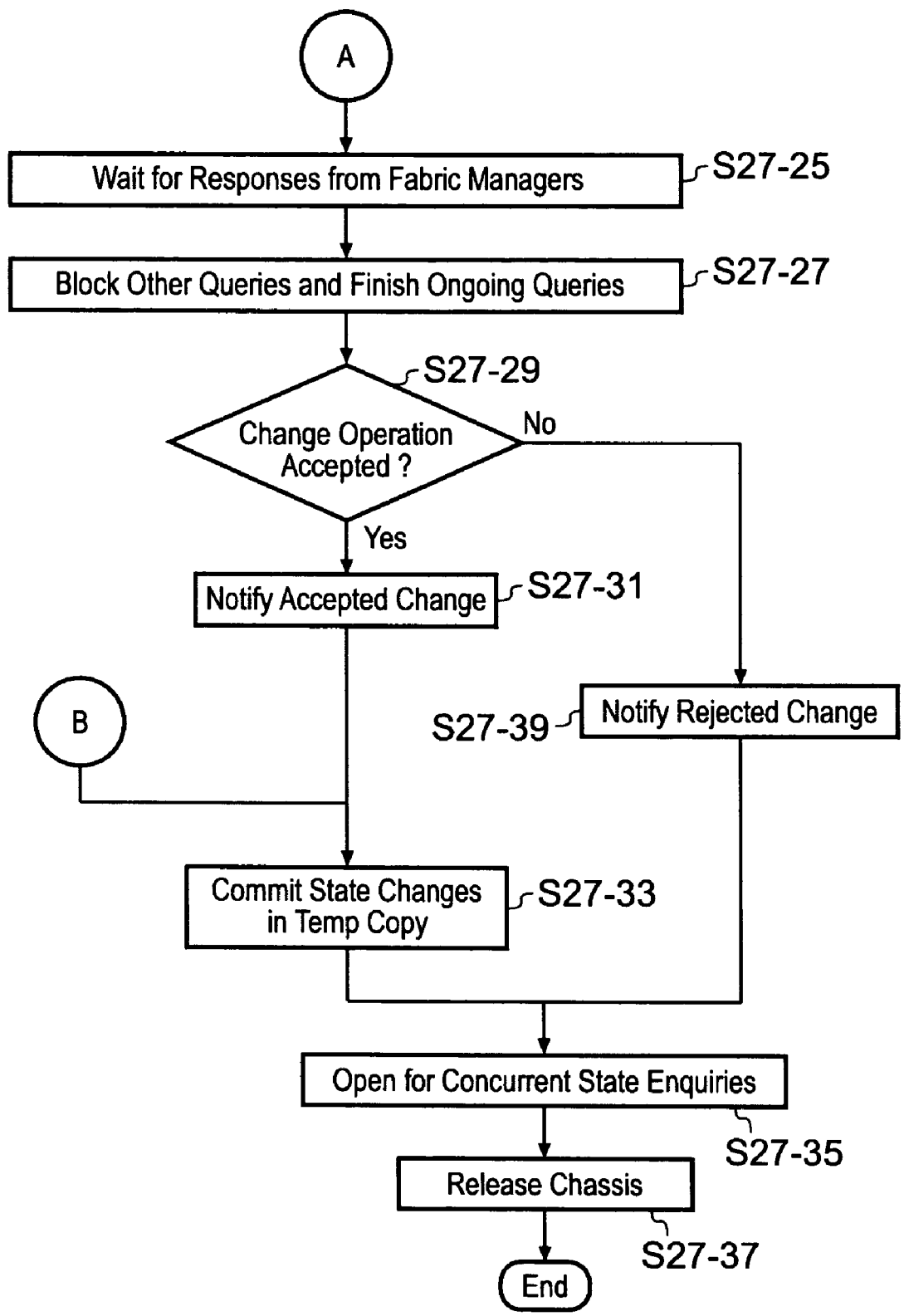

With reference to FIG. 27 (which is made up from FIGS. 27A and 27B), the function starts at step S27-1 where the function waits for any ongoing event handling to complete. Once any ongoing event handling has completed, the function reserves the exclusive right to perform updates within the chassis at step S27-3. Then, at step S27-5, all new incoming queries to the chassis are blocked and any ongoing queries are completed. Following these steps, the chassis is in a state where the function can commence steps associated with the requested change.

Before processing of the requested change, the basic event number is updated, at step S27-7, to ensure that the operations carried out on the chassis are identified by the basic event number of the requested change. Then, at step S27-9, a temporary copy of the state structures describing the chassis is created. Examples of these state structures are discussed above with reference to FIGS. 17 to 19. Then, at step S27-11 the temporary copy of the state structures is updated to reflect the requested change. In order to determine the effect of the requested change on the fabric, the dependency definition function (described above with reference to FIG. 20) is carried out at step S27-13, followed by the fault zone assignment function (described above with reference to FIGS. 21 and 22) at step S27-15. These functions return an indication of whether an externally visible state change will occur as a result of the requested change. This is tested at step S27-17 and if it is determined that the requested change will cause an externally visible state change, then processing continues at step S27-19 where the temporary state information is linked to the committed state information for the chassis such that any subsequent state query replies can reflect the transient state.

Having established that the requested change will affect the externally visible state of the chassis, it is necessary to obtain approval from all fabric entities affected by the change before the change can be committed. Therefore, at step S27-21 the function informs all potentially affected fabric managers of the state change which will occur if the request is committed and requests approval for that change. Then, at step S27-23 the chassis is opened to receive approval/rejection responses from the fabric managers. The function then waits to receive such responses at step S27-25. In some examples, a timeout for receipt of such responses can be implemented. Once all of the responses have been received, the chassis is closed to queries and any ongoing queries (such an status query from the relevant fabric managers—the response to which at this stage would indicate the ongoing nature of a "requested change" operation) are completed at step S27-27. Next, at step S27-29, a check is performed to determine whether the change has been accepted by all of the fabric managers. If so, processing continues at step S27-31 where the acceptance of the change is notified to the relevant fabric managers via notification messages so that those managers can know the status and outcome of the requested change operation. Following this, the state changes recorded in the temporary copy of the state records is committed to the actual state records, thereby updating the chassis to incorporate the approved state change, at step S27-33. With the change completed, the chassis is then opened for enquiries at step S27-35, and then exclusive control of the chassis for updates is relinquished at step S27-37. Following this the function ends.

On the other hand, if it is determined at step S27-17 that the requested change will not cause any externally visible state changes, then processing moves directly from step S27-17 to step S27-33 where the requested change is committed. For this circumstance, there is no need to contact the fabric managers as there will be no change which materially affects them. Following this, steps S27-35 and S27-37 are carried out as described above.

Alternatively, it may be decided at step S27-17 that the requested change does cause an externally visible state change, such that the fabric managers are contacted at steps S27-19 to S27-27. However, if one or more fabric managers rejects the change, then from step S27-29, processing passes to step S27-39 where the rejection of the requested change is notified to the relevant fabric managers via notification messages so that those managers can know the status and outcome of the requested change operation. The temporary copy of the state records is therefore abandoned at the previously existing committed state records are maintained unaltered. Following this, steps S27-35 and S27-37 are carried out as described above.

The above-described process can also be expressed by means of the following pseudo-code.

BEGIN (Requested change function):
  Wait for any ongoing event handling to complete, and reserve exclusive right to chassis state update;
  Block out further queries, and wait until any ongoing queries have completed;
  Update current basic event number;
  Make a temporary copy of the current state structures used by the fault zone definition mechanism;
  Modify the temporary state information (Current operational status of both FRUs and entities) according to the requested change;
  Perform the FRU dependency definition function on the temporary state information;
  Perform the fault zone assignment function on the temporary state information;
  Check if the updated temporary state information implies any externally visible state change;
  IF (externally visible state change):
    Link the temporary transient state to the official state so that subsequent state query replies can reflect also the transient state;
    Request acceptance of the implied state change from all relevant Fabric Manager instances;
    Open up for concurrent state queries;
    WHILE (NOT accept from all relevant FM instances AND NOT reject from any relevant FM instance AND NOT timeout AND NOT local abort):
      Wait for response from any relevant Fabric Manager instance;
    ENDWHILE
    Block out further queries, and wait until any ongoing queries have completed;
    IF (change operation was accepted):
      Notify about accepted change;
      Commit state changes in temporary state information;
      Update official state information with the contents from the temporary state information;
    ELSE (i.e. the change was rejected or aborted):
      Notify about rejected/aborted change;
    ENDIF
  ELSE
    Commit state changes in temporary state information;
    Update official state information with the contents from the temporary state information;
  ENDIF
  Open up for concurrent state queries;

Release exclusive access to chassis state update;
END (Requested change function)
Addition Handling Function Since such changes do not involve any handshaking phase, the change can be carried out as an atomic operation relative to other event handling as well as relative to queries.

Figure 28:
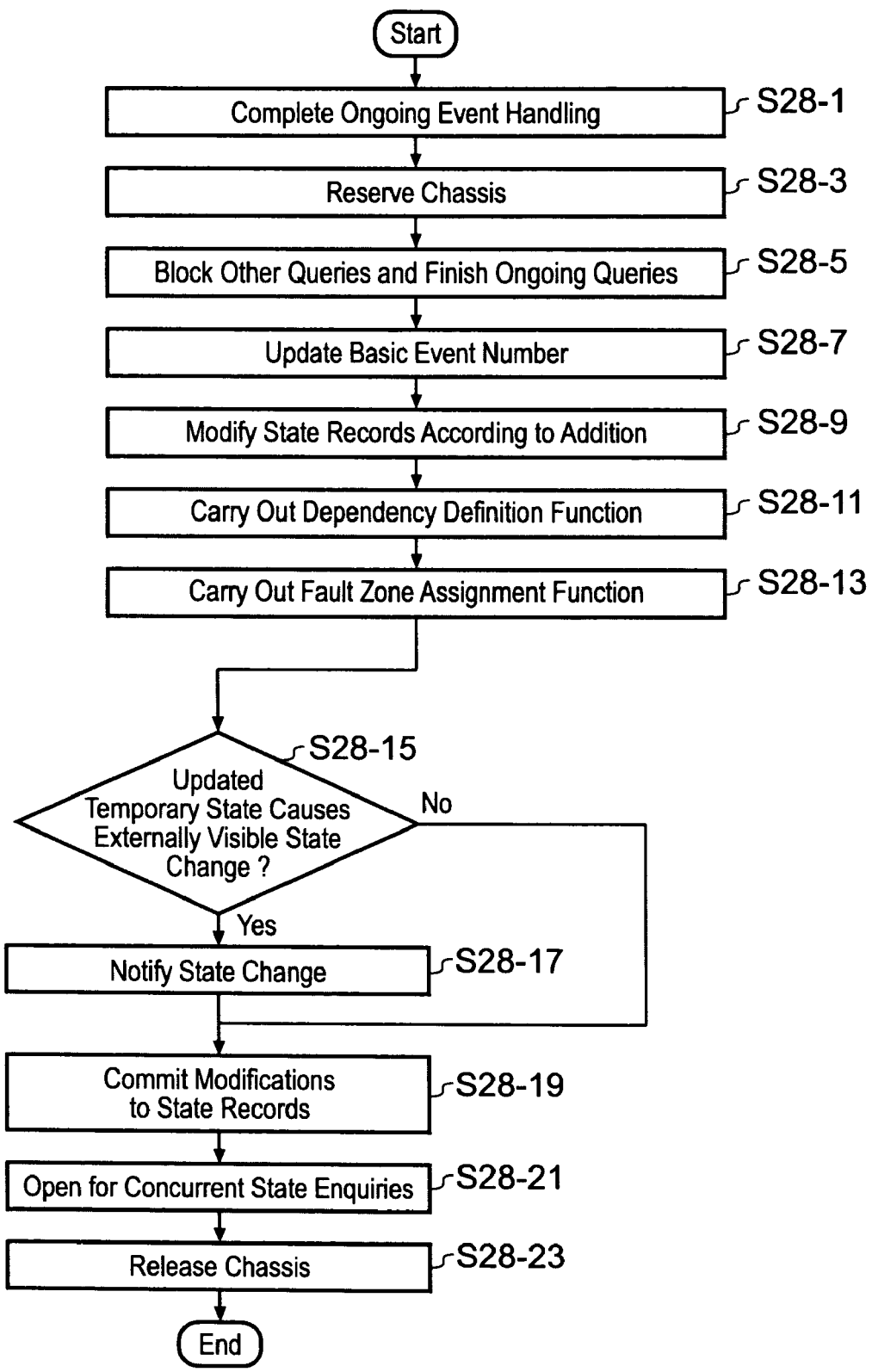
FIG. 28 is a flow diagram showing the operation of an addition handling function.

With reference to FIG. 28, the function commences at step S28-1 where the function waits for any ongoing event handling to complete. Once any ongoing event handling has completed, the function reserves the exclusive right to perform updates within the chassis at step S28-3. Then, at step S28-5, all new incoming queries to the chassis are blocked and any ongoing queries are completed. Following these steps, the chassis is in a state where the function can commence steps associated with the requested change.

Before processing of the requested change, the basic event number is updated, at step S28-7, to ensure that the operations carried out on the chassis are identified by the basic event number of the requested change. Then, at step S28-9, the state records describing the chassis are modified to reflect the addition. In order to determine the effect of the addition on the fabric, the dependency definition function (described above with reference to FIG. 20) is carried out at step S28-11, followed by the fault zone assignment function (described above with reference to FIGS. 21 and 22) at step S28-13. These functions return an indication of whether an externally visible state change will occur as a result of the requested change. This is tested at step S28-15 and if it is determined that the requested change will cause an externally visible state change, then processing continues at step S28-17 where the state change is notified to the relevant fabric managers via notification messages so that those managers can know the outcome of the addition operation. Following this, the modified state records are committed, thereby updating the chassis to incorporate the approved state change, at step S28-19. With the change completed, the chassis is then opened for enquires at step S28-21, and then exclusive control of the chassis for updates is relinquished at step S28-23. Following this the function ends.

On the other hand, if it is determined at step S28-15 that the requested change will not cause any externally visible state changes, then processing moves directly from step S28-15 to step S28-19 as no notification of the change is necessary. Following this, steps S28-21 and S28-23 are carried out as described above.

The above-described process can also be expressed by means of the following pseudo-code.

BEGIN (Addition function):
Wait for any ongoing event handling to complete, and reserve exclusive right to chassis state update;
Block out further queries, and wait until any ongoing queries have completed;
Update current basic event number;
Modify the official state information (Current operational status of both FRUs and entities) for the relevant FRUs and/or entities;
Perform the FRU dependency definition function on the official state information;
Perform the fault zone assignment function on the official state information;
Check if the updated state information implies any externally visible state change;
IF (externally visible state change):
Send notification about the state change to all relevant Fabric Manager instances;
ENDIF
Commit state changes in official state information;
Open up for concurrent state queries;
Release exclusive access to chassis state update;
END (Addition function)
Forced Change & Fault Handling Function Since these changes do not involve any handshaking phase, the change can be carried out as an atomic operation relative to other event handling as well as relative to queries.

Figure 29:
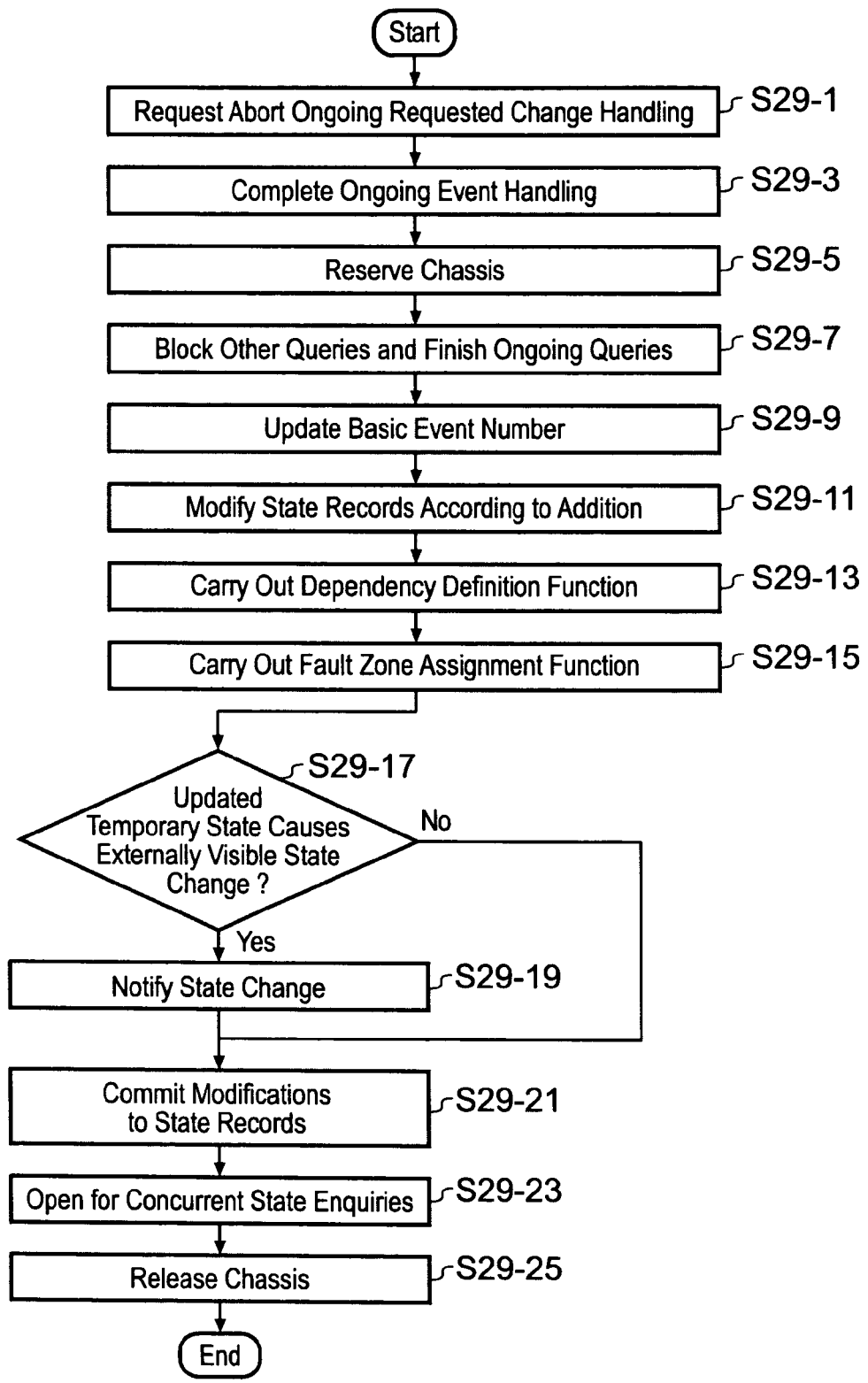
FIG. 29 is a flow diagram showing the operation of a forced change and fault handling function.

With reference to FIG. 29, the function commences at step S29-1 where the function requests that all ongoing requested change handling be aborted, regardless of the current progress of that change handling. Next, at step S29-3 the function waits for any ongoing event handling to complete. Once any ongoing event handling has completed, the function reserves the exclusive right to perform updates within the chassis at step S29-5. Then, at step S29-7, all new incoming queries to the chassis are blocked and any ongoing queries are completed. Following these steps, the chassis is in a state where the function can commence steps associated with the requested change.

Before processing of the requested change, the basic event number is updated, at step S29-9 to ensure that the operations carried out on the chassis are identified by the basic event number of the requested change. Then, at step S29-11, the state records describing the chassis are modified to reflect the addition. In order to determine the effect of the addition on the fabric, the dependency definition function (described above with reference to FIG. 20) is carried out at step S29-13, followed by the fault zone assignment function (described above with reference to FIGS. 21 and 22) at step S29-15. These functions return an indication of whether an externally visible state change will occur as a result of the requested change. This is tested at step S29-17 and if it is determined that the requested change will cause an externally visible state change, then processing continues at step S29-19 where the state change is notified to the relevant fabric managers via notification messages so that those managers can know of the outcome of the forced change/fault operation. Following this, the modified state records are committed, thereby updating the chassis to incorporate the state change, at step S29-21. With the change completed, the chassis is then opened for enquires at step S29-23, and then exclusive control of the chassis for updates is relinquished at step S29-25. Following this the function ends.

On the other hand, if it is determined at step S29-17 that the requested change will not cause any externally visible state changes, then processing moves directly from step S29-17 to step S29-21 as no notification of the change is necessary. Following this, steps S29-23 and S29-25 are carried out as described above.

The above-described process can also be expressed by means of the following pseudo-code.

BEGIN (Forced change and fault function):
Request abortion of any ongoing requested change handling;
Wait for any ongoing event handling to complete, and reserve exclusive right to chassis state update;
Block out further queries, and wait until any ongoing queries have completed;
Update current basic event number;
Modify the official state information (Current operational status of both FRUs and entities) for the relevant FRUs and/or entities;
Perform the FRU dependency definition function on the official state information;
Perform the fault zone assignment function on the official state information;

Check if the updated state information implies any externally visible state change;
IF (externally visible state change):
　　Send notification about the state change to all relevant Fabric Manager instances;
ENDIF
Commit state changes in the official state information;
Open up for concurrent state queries;
Release exclusive access to chassis state update;
END (Forced change and fault function)

Establishing Initial State at System Startup

This function can be provided by the function for handling of additions. However, in the present example a separate function is provided as no notifications are necessary because the function is only used at system startup. In this regard, it is assumed that any fabric managers interested in the status of the chassis have "pre-registered" their interest in the chassis. If this is not the case, then the following method can be adapted to take account of this.

Figure 30:
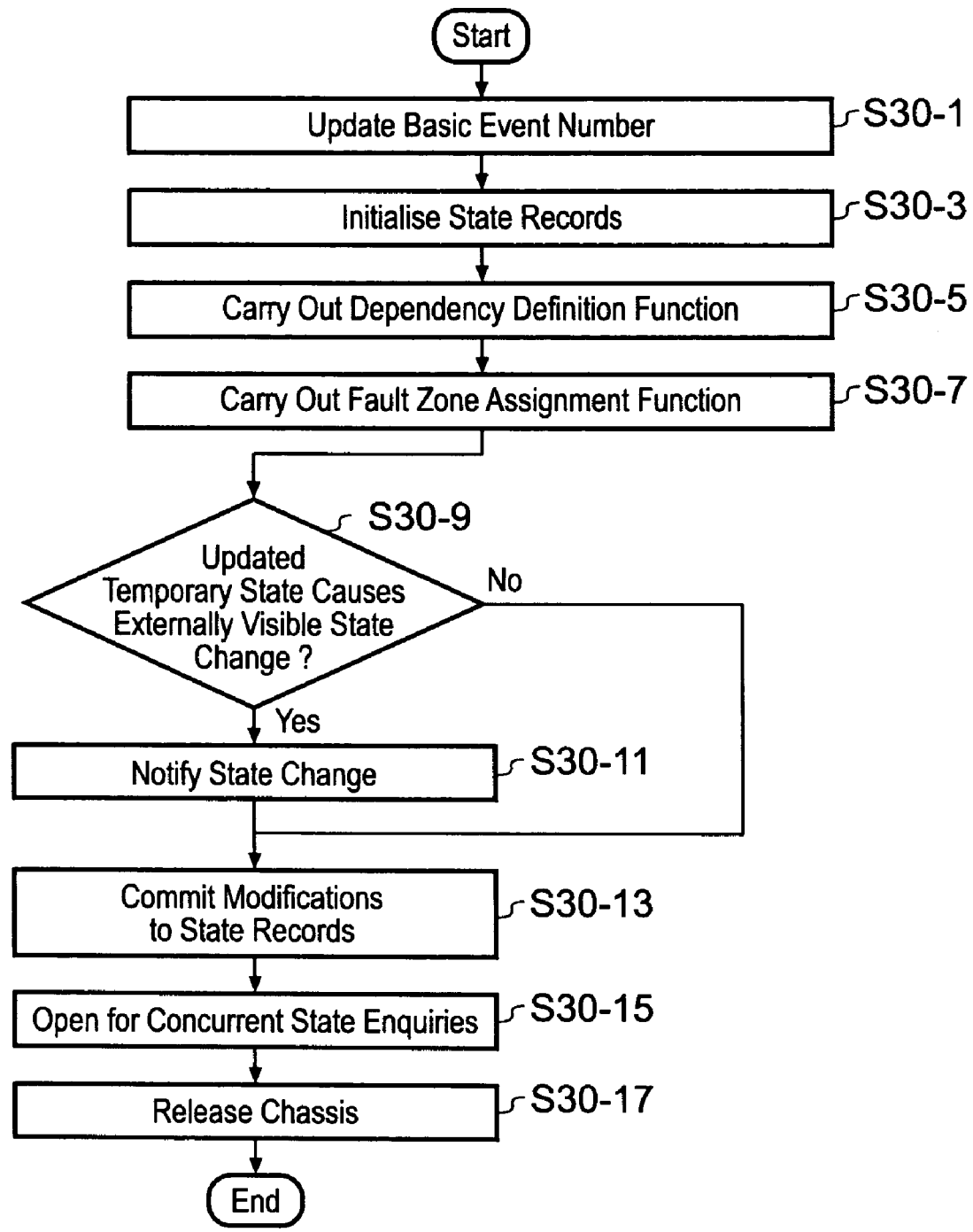
FIG. 30 is a flow diagram showing the operation of a function for establishing system state at start-up.

With reference to FIG. 30, the function commences at step S30-1 where the basic event number is updated to ensure that the operations carried out on the chassis are identified by the basic event number of the requested change. Then, at step S30-3, the state records describing the chassis are initialised. Next, the dependency definition function (described above with reference to FIG. 20) is carried out at step S30-5, followed by the fault zone assignment function (described above with reference to FIGS. 21 and 22) at step S30-7. These functions return an indication of whether an externally visible state change has occurred since the system was last started-up. This is tested at step S30-9 and if it is determined that an externally visible state change has occurred, then processing continues at step S30-11 where the state change is notified to the relevant fabric managers via notification messages so that those managers can know of the outcome of the system state determination. In the present example, the term "externally visible state change" covers all resources that have become available for the relevant fabric managers to use. Thus if no resources have become available in the chassis then no notifications will be required. Following this, the modified state records are committed, thereby updating the chassis to incorporate the state change, at step S30-13. With the change completed, the chassis is then opened for enquires at step S30-15, and then exclusive control of the chassis for updates is relinquished at step S30-17. Following this the function ends.

On the other hand, if it is determined at step S30-9 that the requested change will not cause any externally visible state changes, then processing moves directly from step S30-9 to step S30-13 as no notification of the change is necessary. Following this, steps S30-15 and S30-17 are carried out as described above.

The above-described process can also be expressed by means of the following pseudo-code.
BEGIN (System startup function):
Update current basic event number;
Initialize the official state information (Current operational status of both FRUs and entities) for the relevant FRUs and/or entities;
Perform the FRU dependency definition function on the official state information;
Perform the fault zone assignment function on the official state information;
Check if the updated state information implies any externally visible state change;
IF (externally visible state change):
　　Send notification about the state change to all relevant Fabric Manager instances;
ENDIF
Commit state changes from temporary to official state information;
Open up for concurrent state queries;
Release exclusive access to chassis state update;
END (System startup function)

Message Handling Related Functions

In the present example, messages are handled based on the current basic event number. Outgoing messages are retransmitted with fixed intervals as long as no acknowledgement has been received and the current basic event number has not been updated. If the current basic event number changes, then the transmission context is immediately aborted.

All out-going requests and notification messages include both the current event number and the previous event number (both major and minor event number components). In this way, any Fabric Manager client will be able to determine if any intermediate notification has been lost, and if so perform the required query operations in order to establish the complete current state of the chassis and the fabric entities it contains.

Note that since initial notification messages are generated (but not necessarily sent) before a new basic event number can be generated, the Fabric Manager clients will always be able to observe any "gap" in the message sequence. This mechanism is superficially similar to systems used for detecting loss of packet sequence numbers used by traditional reliable transport protocols. In the present case, the recovery is to perform state queries rather than making sure that lost notification messages are retransmitted.

Update Current Basic Event Number Function

Figure 31:
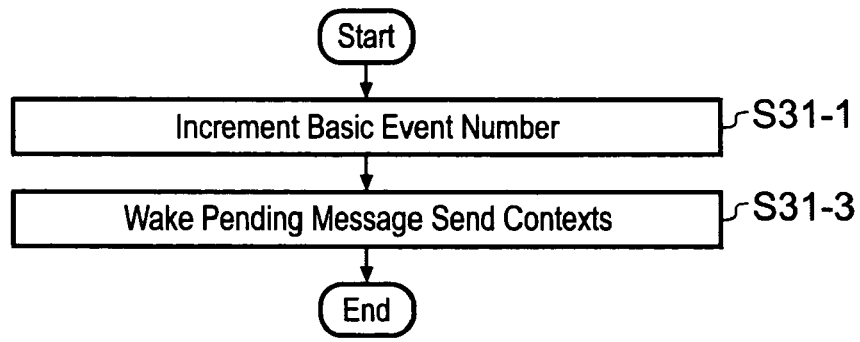
FIG. 31 is a flow diagram showing the operation of a function for updating the current basic event number.

This function updates the basic event number. As shown in FIG. 31, the function starts at step S31-1 by incrementing the basic event number and then, at step S31-3, continues by waking up all pending message send contexts. This ensures that the proper action (e.g. abort the relevant message send context) will take place as a result of the new basic event number.

The above-described process can also be expressed by means of the following pseudo-code.
BEGIN (Update current basic event number):
Increment the current basic event number with one;
Wake up all pending message send contexts;
END (Update current basic event number)

Send Notification or Send Message

Figure 32:
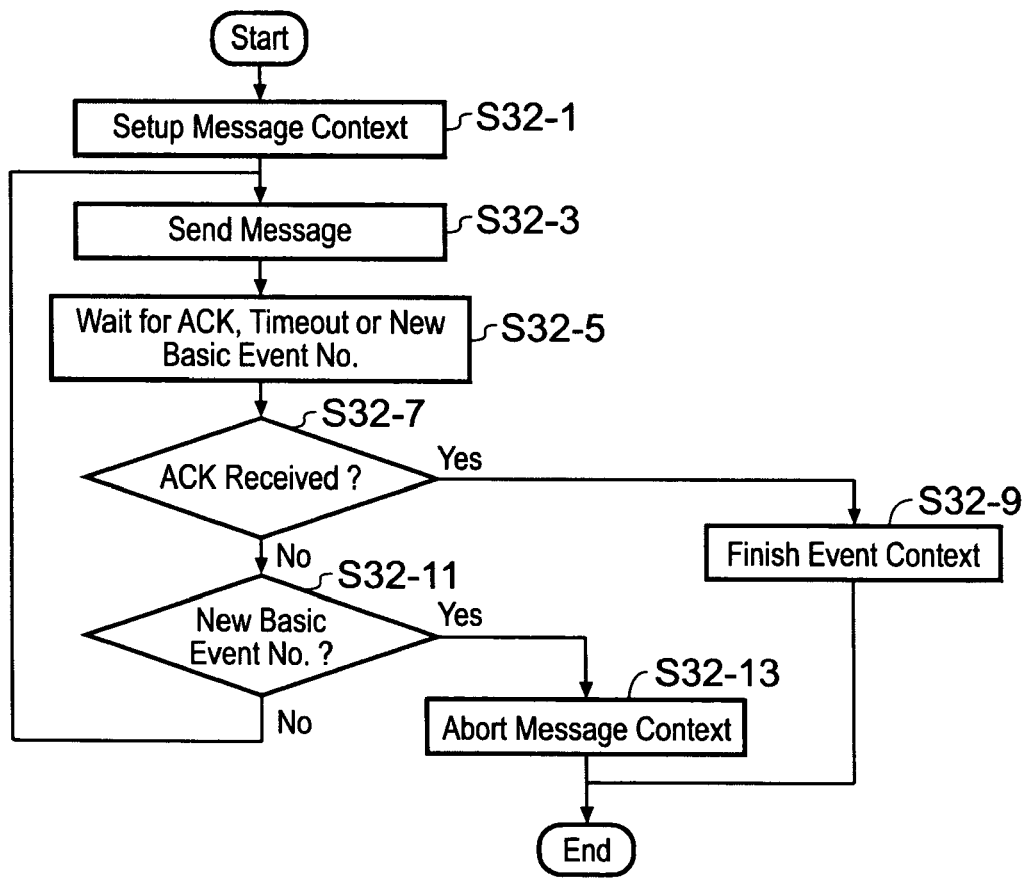
FIG. 32 is a flow diagram showing the operation of a function for sending notifications or messages.

This function controls the sending of notifications and messages. With reference to FIG. 32, at step S32-1 the message context is set up with the current basic event number, the previous event number and updated current minor event number. In the present example, this step takes place in the same sequential thread of control as the handling of the basic change event. Any further steps below may be implemented by other threads that may be spawned dynamically on a per message context basis, alternatively the message contexts can be implemented as individual data structures that are handled by one or more independent threads. In particular, it is assumed that the wait operation below does not suspend the same sequential thread of control as the handling of the basic change event. Next, at step S32-3, the message (or notification) is sent. The function then waits for one of an acknowledgement, a timeout or a new basic event number (step S32-5). When one of these occurrences happens, processing continues at step S32-7 where the occurrence is examined to determine whether an acknowledgement has occurred. If so the function directs processing to step S32-9 where the message context is finished as the message has been successfully sent. The function then ends. On the other hand, if the occurrence is not an acknowledgement, then at step S32-7, processing is passed to step S32-11 where the occurrence is examined to determine whether a new basic event number has occurred. If so, processing passes to step S32-13 where the message context is aborted as the message cannot be continued under the new basic event number. The process then ends. Alternatively, if it is determined that at step S32-11 that the occurrence is not a new basic event number, then by a process of elimination, the occurrence must be a timeout. This causes processing to return to step S32-3 where the message is resent.

The above-described process can also be expressed by means of the following pseudo-code.

Figure 33:
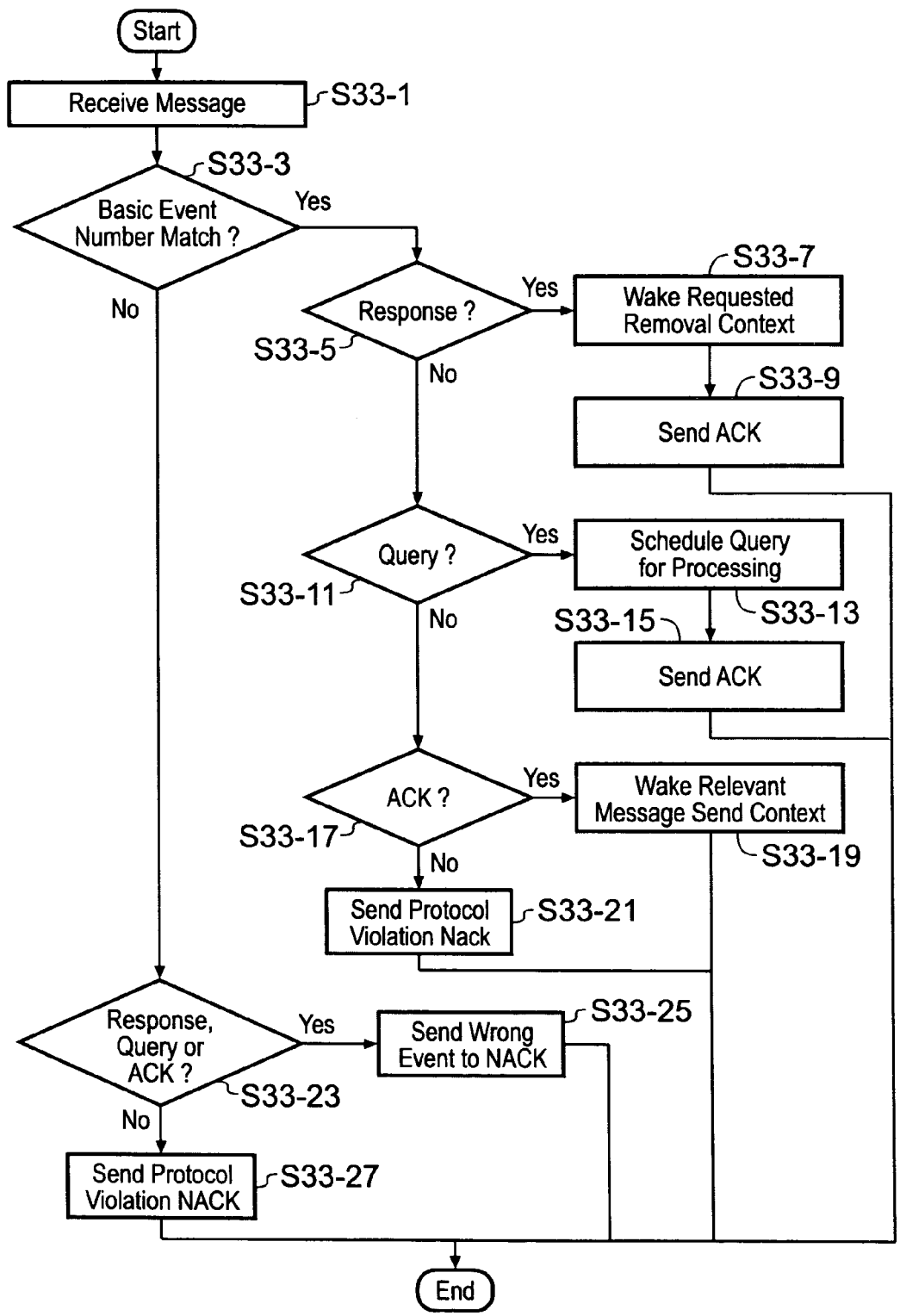
FIG. 33 is a flow diagram showing the operation of a function for handling received messages.

BEGIN (Send notification or request message):
Set up message context with current basic event number, previous event number and updated current minor event number;
{The step above takes place in the same sequential thread of control as the handling of the basic change event. Any further steps below may be implemented by other threads, and in particular, it is assumed that the wait operation below does not suspend the same sequential thread of control as the handling of the basic change event.}
Send the message;
WHILE (NOT transmission ok AND NOT transmission aborted):
　Wait for acknowledgement, timeout or new current basic event number;
　IF (acknowledgement):
　　Finish the message context;
　　transmission OK—true;
　ELSEIF (new current basic event number):
　　abort the message context;
　　transmission aborted=true;
　ELSE (i.e. timeout):
　　re-send the message;
　END IF
ENDWHILE
END (Send notification or request message)
Receive Message Function This function handles the receipt of messages. As shown in FIG. 33 the process starts at step S33-1 with the receipt of a message. Next, at step S33-3, the received message is examined to determine whether the expected basic event number of the message matches the current basic event number. If a match occurs, processing continues at step S33-5 where the message is further analysed to determine its payload. If the payload is a response to a previously initiated box manager to fabric manager message then processing continues at step S33-7 where the relevant requested removal context is woken and the message passed to that context for further handling. An acknowledgement of the message is then sent at step S33-9 before the function ends.

On the other hand, if at step S33-5 it is determined that the message is not a response, the message is further analysed at step S33-11 to determine whether the payload is a query. If so, processing continues at step S33-13 where the query is scheduled for processing, followed by the sending of an acknowledgement of the message at step S33-15 before the function ends.

If at step S33-11 it is determined that the message is not a query, then at step S33-17 the message is further analysed to determine whether the payload is an acknowledgement. If so, then at step S33-19 the relevant message send context is woken and the acknowledge is passed to that context for handling before the function ends.

Otherwise, if at step S33-17 the payload is determined not to be an acknowledgement, then the payload must be either unexpected or unknown. Therefore at step S33-21 a protocol violation NACK (not-acknowledge) is sent before the function ends.

On the other hand, if at step S33-3 it is determined that the expected basic event number in the message and the current basic event number do not match, then the message is analysed at step S33-23 to determine whether the payload corresponds to one of a response, a query or an acknowledgement. If so, a wrong event number NACK is sent at step S33-25 before the function ends. Otherwise, the payload must be either unexpected or unknown. Therefore at step S33-27 a protocol violation NACK (not-acknowledge) is sent before the function ends. It is irrelevant for the purposes of an unknown or unexpected message whether the basic event numbers match or not, as the message cannot be processed in any case, thus the NACK sent for this case is a protocol violation NACK rather than a wrong event number NACK.

The above-described process can also be expressed by means of the following pseudo-code.

BEGIN (Receive message):
IF (expected basic event number in message matches current basic event number):
　IF (response):
　　Wake up the (single) requested removal context;
　　Send acknowledgement;
　ELSEIF (query):
　　Schedule the query for processing;
　　Send acknowledgement;
　ELSEIF (acknowledgement):
　　Wake up the relevant message send context;
　ELSE (i.e. unexpected or unknown message):
　　Send protocol violation nack;
　ENDIF
ELSE (i.e. basic event number mismatch):
　IF (response):
　　Send wrong event number nack;
　ELSEIF (query):
　　Send wrong event number nack;
　ELSIF (acknowledgement:
　　Send wrong event number nack;
　ELSE (i.e. unexpected or unknown message):
　　Send protocol violation nack;
　END IF
ENDIF
END (Receive message):

Thus there has now been described a system for determining the fault tolerance characteristics of a computer system in terms of component interdependencies and redundancy. The fault tolerance characteristics can be managed in terms of fault zones representing one or more components having individual redundancy characteristics. The system can be self-administrating to monitor changes in dependencies which may occur as a result of component changes within the system and an example of a full set of protocols and functions for the carrying out of the administration of such a system has also been described.

Insofar as embodiments of the invention described above are implementable, at least in part, using a computer system, it will be appreciated that a computer program for implementing at least part of the described methods and/or the described systems and/or the described fault zone definition mechanism, is envisaged as an aspect of the present invention. The computer system may be any suitable apparatus, system or device. For example, the computer system may a programmable data processing apparatus, a general purpose computer, a Digital Signal Processor or a microprocessor. The computer program may be embodied as source code and undergo compilation for implementation on a computer, or may be embodied as object code, for example.

Suitably, the computer program can be stored on a carrier medium in computer usable form, which is also envisaged as an aspect of the present invention. For example, the carrier medium may be solid-state memory, optical or magneto-optical memory such as a readable and/or writable disk for example a compact disk and a digital versatile disk, or magnetic memory such as disc or tape, and the computer system can utilise the program to configure it for operation. The computer program may be supplied from a remote source embodied in a carrier medium such as an electronic signal, including radio frequency carrier wave or optical carrier wave.

In view of the foregoing description of particular embodiments of the invention it will be appreciated by a person skilled in the art that various additions, modifications and alternatives thereto may be envisaged. For example, embodiments of the present invention are not limited to implementations in an Infiniband architecture interconnect environment, but may be implemented for networks operating in accordance with other protocols and architectures. Additionally, fault zones may be defined not only on the basis of field replaceable units, which may themselves be considered components of a chassis or interconnect environment, but also on individual components located on field replaceable units. That is to say, that the term "component" may refer to an individual field replaceable unit, an individual component, for example mounted on a field replaceable unit, or a resource such as a processing unit storage resource or external network interface for example, as demanded by the context.

Although an embodiment of the invention has been described with reference to the Box Manager as a software module, it will be evident to persons of ordinary skill in the art that the Box Manager and fault zone definition mechanism may be implemented any one or combination of two or more of software, firmware or hardware.

Although the above described examples refer to the establishment and management of fault zones within an Infiniband fabric, the concepts expressed therein can be applied to any interconnected computing environment. In this regard, any environment in which a plurality of processing platforms and devices can be managed for fault zones in accordance with the described methods and processes. For example, in a multi-processing architecture, identifying which groups of components rely on, share or use each other, or share dependency on a single component, provides for the identification of those groups of components as single points of failure within the environment. Accordingly, any resource which is managed by some form of resource manager can be managed for fault zones in this manner.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. A computer system including a fault zone definition mechanism for an interconnect environment comprising a plurality of components, said fault zone definition mechanism comprising:
   a manager unit operable to:
      access information regarding the construction of the interconnect environment, wherein the information is built into the manager unit;
      check the status of the components during start up to determine if they are operational;
      analyze properties of the components of the interconnect environment to determine a dependency status for each component based on the construction information built into the manager unit and the status of the components, wherein analyzing the properties of the components involves examining a set of dependency lists for a given component to determine if at least one of the dependency lists includes exactly one other component that provides a service to the given component in order to keep the given component operational; and
      group components having a common dependency status into a logical group defining a fault zone for said interconnect environment.

2. The computer system of claim 1, wherein the logical group comprises one or more components.

3. The computer system of claim 1, said manager unit further operable to:
   assign a common fault zone identifier to each one of said logical group of components having said common dependency status.

4. The computer system of claim 1, said manager unit further operable to monitor a state of at least one said logical group of components.

5. The computer system of claim 4, said manager unit further operable to re-assess the dependency status of a component responsive to a change of state of said monitored group.

6. The computer system of claim 5, said manager unit further operable to assign a common fault zone identifier to each one of a group of components determined to have a common dependency status following said re-assessment.

7. The computer system of claim 5, wherein said change of state comprises a component failure.

8. The computer system of claim 1, wherein at least one of said components comprises a node for an interconnect environment.

9. The computer system of claim 8, wherein said node is a processor node or end-node.

10. The computer system of claim 1, wherein at least one of said components comprises an interconnect port for an interconnect environment.

11. The computer system of claim 1, said fault zone definition mechanism operable for an InfiniBand interconnect environment.

12. The computer system of claim 1, wherein said dependency status for a given component is representative of a further component upon which the given component is reliant.

13. The computer system of claim 12, wherein said dependency status for the given component is further representative of another component upon which the further component is reliant.

14. A computer-readable storage medium storing a Box Manager program module operable for a chassis defining a physical support for units including one or more components of an interconnect environment, said Box Manager program module operable to cause a programmable processing apparatus to define a fault zone for the interconnect environment, said defining comprising:
   accessing information regarding the construction of the interconnect environment, wherein the construction information is built into the Box Manager program module;
   checking the status of the components during start up to determine if they are operational;
   analyzing components of the interconnect environment to determine a dependency status for each component based on the construction information built into the Box Manager program module and the status of the components, wherein analyzing the components involves examining a set of dependency lists for a given component to determine if at least one of the dependency list includes exactly one other component that provides a service to the given component in order to keep the given component operational; and
   grouping components having a common dependency status into a logical group defining a fault zone for said interconnect environment.

15. The computer-readable storage medium of claim 14, wherein the Box Manger program module is further operable to execute on a computing platform associated with said chassis, said computing platform including a service processor and memory space.

16. The computer-readable storage medium of claim 15, wherein said service processor configured to comprise two or more co-operating service processor instances associated with said chassis.

17. The computer-readable storage medium of claim 15, wherein the Box Manager program module is operable to store a fault zone identifier in said memory space.

18. A chassis defining a physical support for units including components of an interconnect environment, said chassis comprising:
   a computing platform including a service processor and a memory space; and
   a box manager module operable to execute on the computing platform and operable to define a fault zone for the interconnect environment, said defining comprising:
   accessing information regarding the construction of the interconnect environment, wherein the construction information is built into the box manager module;
   checking the status of the components during start up to determine if they are operational;
   analyzing components of the interconnect environment to determine a dependency status for each component based on the construction information built into the box manager module and the status of the components, wherein analyzing the components involves examining a set of dependency lists for a given component to determine if at least one of the dependency lists includes only one other component that provides a service to the given component in order to keep the given component operational; and
   grouping components having a common dependency status into a logical group defining a fault zone for said interconnect environment within said chassis.

19. The chassis of claim 18, further comprising two or more co-operating service processor instances associated with said chassis.

20. The chassis of claim 18, said chassis configured to support one or more field replaceable units each comprising one or more of said components.

21. A fault zone definition method for an interconnect environment, said fault zone definition method comprising:
   steps for grouping components of an interconnect environment having a common dependence into a logical group defining a fault zone for said interconnect environment, wherein the dependency status for each component is based on information regarding the construction of the interconnect environment which can be accessed by a manager unit, wherein said information includes a set of dependency lists for each component that the manager unit can use to determine if at least one of the dependency lists for a given component includes exactly one other component that provides a service to the component in order to keep the component operational, and the status of the components which can be checked during start up by the manager unit, wherein the construction information is built into the manager unit.

22. A computer system including a fault zone definition mechanism for an interconnect environment comprising a plurality of components, said fault zone definition mechanism comprising:
   a manager unit operable to:
   maintain a list of components, wherein each entry in the list is associated with a given component, wherein each entry in the list includes a set of dependency lists, and wherein each dependency list includes a list of other components that provide a given type of service to the component in order to keep the component operational;
   determine whether a given dependency list of the component includes exactly one entry;
   if so, add the only one entry to a single-service dependency list associated with the component;
   determine whether a group of components share a dependency upon a single component based on corresponding single-service dependency lists; and
   if so, define a fault zone that includes the group of components for the interconnect environment.

* * * * *